US007886024B2

(12) United States Patent
Kelly et al.

(10) Patent No.: US 7,886,024 B2
(45) Date of Patent: Feb. 8, 2011

(54) SHARING MEDIA OBJECTS IN A NETWORK

(75) Inventors: Sean Kelly, Seattle, WA (US); Lili Cheng, Bellevue, WA (US); Shelly Farnham, Seattle, WA (US); William Portnoy, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1305 days.

(21) Appl. No.: 10/882,727

(22) Filed: Jul. 1, 2004

(65) Prior Publication Data

US 2006/0004914 A1 Jan. 5, 2006

(51) Int. Cl.
*G06F 7/00* (2006.01)
*G06F 15/16* (2006.01)

(52) U.S. Cl. ....................... 709/219; 709/218; 707/749; 707/748

(58) Field of Classification Search ................. 709/218, 709/219; 707/748, 749
See application file for complete search history.

(56) References Cited

U.S. PATENT DOCUMENTS

| | | | | |
|---|---|---|---|---|
| 5,950,200 | A * | 9/1999 | Sudai et al. | 707/9 |
| 7,069,308 | B2 * | 6/2006 | Abrams | 709/218 |
| 7,478,078 | B2 * | 1/2009 | Lunt et al. | 707/1 |
| 2004/0103156 | A1 * | 5/2004 | Quillen et al. | 709/206 |

OTHER PUBLICATIONS

Farnham et al., Wallop: Designing Social Software for Co-Located Social Networks, 37th Hawaii In'l Conf. on Syst. Sci., Jan. 5, 2004, pp. 1-10.

Kumar et al., On the Bursty Evolution of Blogspace, ACM Int'l WWW Conf., May 20, 2003, pp. 568-576.

McDonald, Recommending Collaboration with Social NetworksL: A Comparative Evaluation, ACM CHI 2003, vol. 5, No. 1, Apr. 5, 2003, pp. 593-600.

Searls et al., Building with Blogs, Linux Journal, vol. 2003, No. 107, Mar. 2003, p. 4.

Tepper, The Rise of Social Software, netWorker, Sep. 2003, vol. 7, No. 3, pp. 19-23.

MSR Projects, http://research.microsoft.com/scg/#projects.

Declaration of Lili Cheng dated Oct. 4, 2005, 2 pages.

Maass, Henning; "Location-aware mobile applications based on directory services," Mobile Networks and Applications 3, 1998, pp. 157-173, Baltzer Science Publishers BV.

Heller, Nathan; "Newfangled Networking," Harvard Magazine, Nov./Dec. 2004, pp. 68-71, Harvard Magazine Inc., Cambridge, USA.

* cited by examiner

*Primary Examiner*—George C Neurauter, Jr.
*Assistant Examiner*—Anish Sikri
(74) *Attorney, Agent, or Firm*—L. Alan Collins; Collins & Collins Incorporated

(57) ABSTRACT

A method, computer readable medium, user component, and system for sharing media object in a network environment are disclosed. A network manager may determine a similarity metric between users of the environment, between media objects, and/or between a user and media objects. Based upon the similarity metric, the network manager may share media objects with another user if the similarity metric exceeds a predetermined value or is more similar than other retrieved media objects. A user component may also provide a network map manager to display a network map, and may provide a tailored view manager to display a web log associated with at least one of the user icons displayed in the network map.

30 Claims, 13 Drawing Sheets

SHARING MEDIA OBJECTS IN A NETWORK

FIELD OF THE INVENTION

The present disclosure relates generally to the field of network communications and, in particular, the present disclosure concerns sharing media objects in a network.

BACKGROUND

Computer systems are continuing to grow in popularity and are frequently interconnected with other systems via networks, such as local area networks and the Internet. Applications have been developed that allow media content such as text, video clips, pictures, and sound bytes, to be shared in online spaces. Typically, the media content is either shared by broadcast communications where anyone having access to the network can access the media, or the media is shared in directed communications where only specified recipients receive the media. Web pages and web logs (blogs) are examples of applications that broadcast information over the Internet. Electronic mail (e-mail) and instant messaging (IM) are examples of applications that facilitate directed communications between network users.

Network users have been grouped together based on social, interest, and/or work relationships to define relationship networks. One application that has been developed for relationship networks is a network map that illustrates which users of the network are related.

SUMMARY

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

Typically, users of relationship networks communicate to others in the network using separate communication methods, such as e-mail and instant messaging. Integrated tools for sharing media in relationship networks have not been developed.

The present disclosure concerns a network manager that supports media enhanced sharing and/or communication in the context of a network of computer users. The network may be displayed to the computer users or members with a network map of user icons that represent members of the network. The network map may indicate not only which members are related, but also how one or more members are related to other members of the network, and the degree of relationship between one or more members.

In one embodiment, the network manager provides an indication of how closely members of the network are related based upon a similarity metric. The user-user similarity metric may be based on any combination of factors such as transaction histories, co-occurrence information, statements of friendship, communication patterns of the users and/or any other suitable factor of similarity between users. The network manager may provide a similarity metric between a media object and a user. The user-object similarity metric may be based on any combination of factors such as the whether the person is the author of the object, whether the person is in the object, whether the person accessed the object, whether the person linked the object to another object, whether the person commented on the object and any other suitable similarity factors. The network data manager may provide an object-object similarity metric based on any combination of factors such as identical authors of the objects, the objects are acted upon by the same user, or similar metadata of both objects (e.g., labels).

The network manager may use the user and/or object similarity metric to select which media objects and/or user icons to display and/or determine the placement of the media objects and/or user icons in the display to the user. In one embodiment, a relatively short displayed distance between media objects and/or user icons is indicative of high similarity between the media objects and/or members; and a relatively long displayed distance between media objects and/or user icons is indicative of low similarity between the media objects and/or members.

The network manager may also associate at least one web log with each member that may be accessible through the user icons, such that selecting a user icon causes the associated web log to be displayed. The network manager may also provide a display of member identification information to members of the network. In one embodiment, a user input tool allows members of the network to post media objects on the web logs through the user input tool of the network manager.

Media objects posted using the network manager, such as to the web log, can take a variety of forms and can be posted in a variety of ways. The content can include any type of media, such as images including pictures and video clips, sound bytes, links to other media objects and/or web pages, and/or any source of text. Media objects can be posted using the network manager by a member to add to that member's own web log and/or can be posted by a member onto another member's web log.

In one embodiment, a user input tool of the network manager allows members of the network to post comments on previously posted media objects or to identify members shown in the images and/or provide a personal comment. In one embodiment, the network manager captures media objects in electronic communications such as e-nails and/or instant messages, and posts captured media objects on one or more web logs.

In one embodiment, posted media objects may be forwarded by the network manager to an individual user. The network manager may forward a media object based on the determined similarity between the author who posted the media object and an individual user and/or the similarity between the subject matter of the posted media object and the individual user.

For example, a user input tool may be provided that allows members of the network to post a media object. The network manager may then automatically forward that media object to another member by determining a user-user similarity metric from metadata associated with the member who posted the media object and other members in the network. The posted content may be forwarded to an identified member who has a close relationship with the posting member. Similarly, the network manager may forward a posted media object to another member by determining a user-user similarity metric from metadata associated with the subject matter of the posted media object and members in the network. The posted media object may be forwarded to an identified member who has a similarity to the posted media object.

One system for sharing media objects in a network environment includes a database, a memory, and a processor. The database stores a media object that is shared with the members of the network. The processor is coupled to the database and to the memory. The processor carries out a plurality of functions including accepting a media object from a first user of the network environment, storing the media object in the database, determining a similarity metric between a second user and at least one of the first user and the media object, and sharing the media object with the second user. In one embodiment, the processor receives an electronic communication from the first user and parses the media object from the electronic communication.

DETAILED DESCRIPTION

Figure 1:
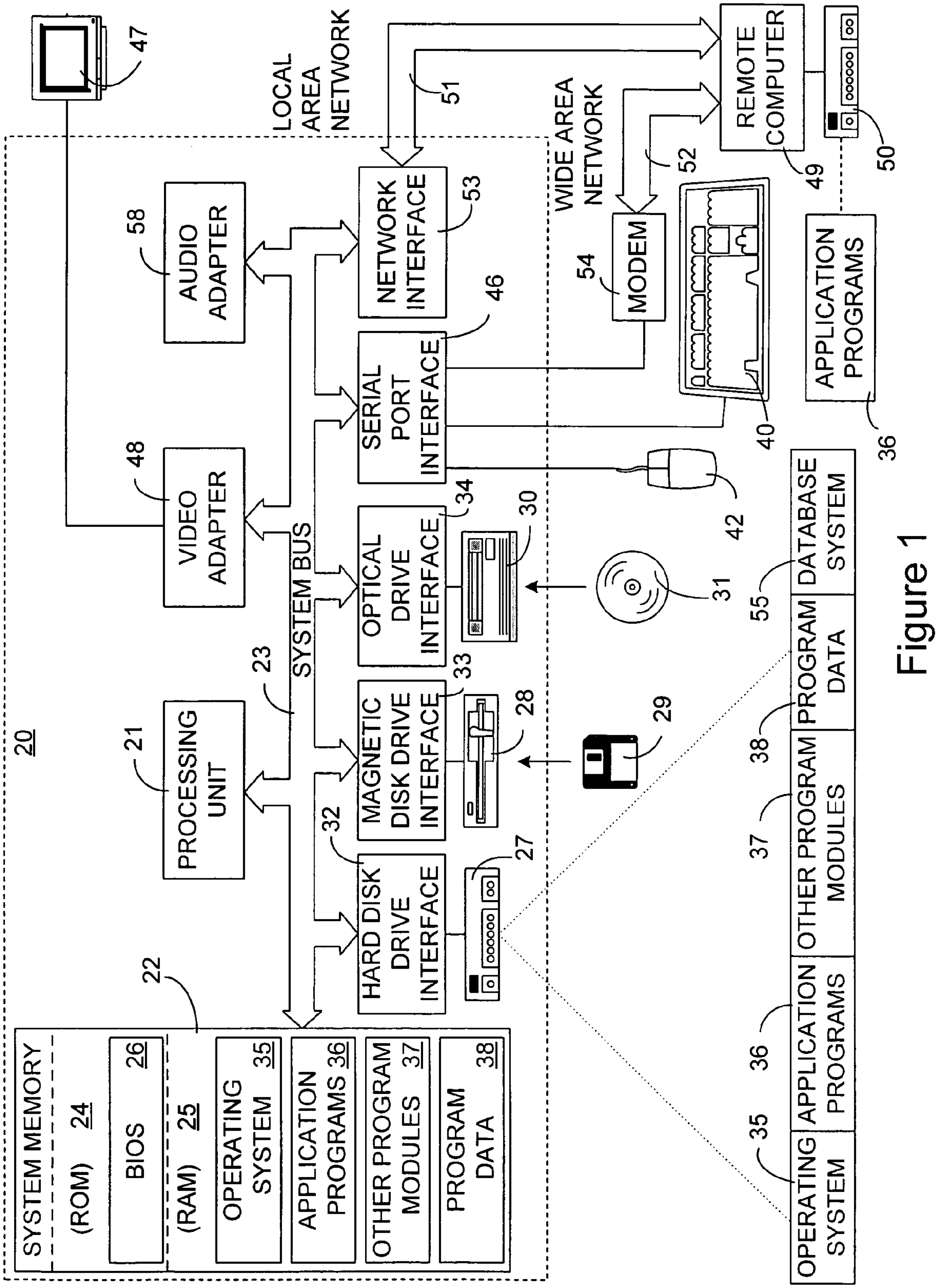
FIG. 1 is a schematic depiction of a computer system used in practicing an exemplary embodiment of the disclosed method.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular data types.

Those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. These computer systems also may be general purpose computer systems. In a distributed computing environment, program modules may be located in both local and remote memory storage devices. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., SIP or TCP/IP). It should be appreciated that the invention is not limited to executing on any particular system or group of systems.

With reference to FIG. 1, an exemplary system for implementing the invention includes a general purpose computing device in the form of a conventional personal computer 20, including a processing unit 21, a system memory 22, and a system bus 23 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disk drive 30 for reading from or writing to a removable optical disk 31 such as a CD ROM or other optical media. Hard disk drive 27, magnetic disk drive 28, and optical disk drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk 27, a removable magnetic disk 29 and a removable optical disk 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk 27, magnetic disk 29, optical disk 31, ROM 24 or RAM 25, including an operating system 35, one or more application programs 36, other program modules 37, and program data 38. A database system 55 may also be stored on the hard disk, magnetic disk 29, optical disk 31, ROM 24 or RAM 25. A user may enter commands and information into personal computer 20 through input devices such as a keyboard 40 and pointing device 42. Other input devices may include a microphone, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 1. The logical connections depicted in FIG. 1 include local area network (LAN) 51 and a widearea network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over wide area network 52, such as the Internet. Modem 54, which may be internal or external, is connected to system bus 23 via serial port interface 46. In a networked environment, program modules depicted relative to personal computer 20, or portions thereof, may be stored in remote memory storage device 50. It will be appreciated that the network connections shown are exemplary and other means of establishing a communications link between the computers may be used.

The computing devices illustrated in FIG. 1 typically include some form of computer readable media. Computer readable media can be any available media that can be accessed by other computing devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing systems in the SIP node. Communication media typically embodies computer readable instructions, data structures, program modules or other data in a modulated data signal such as a carrier wave or other transport mechanism and includes any data in a modulated data signal such as a carrier wave or other transport mechanism and includes any information delivery media. By way of example, and not limitation, communication media includes wired media such as wired network or direct-wired connection, and wireless media such as acoustic, RF, infrared, and other wireless media. Combinations of any of the above should also be included within the scope of computer readable media.

One or more output devices and one or more input devices may be connected to the computer system. The invention is not limited to the particular input or output devices used in combination with the computer system or to those described herein.

The computer system may be a general purpose computer system which is programmable using a computer programming language, such as SmallTalk, C++, Java, Ada, or C#(C-sharp), or other language, such as a scripting language or even assembly language. Various aspects of the invention may be implemented in a non-programmed environment (e.g., documents created in HTML, XML or other format that when viewed in a window of a browser program, render aspects of a graphical user interface or perform other functions). Various aspects of the invention may be implemented as programmed or non-programmed elements, or any combination thereof. The computer system may also be specially programmed, special purpose hardware, or an application specific integrated circuit (ASIC). The remote system 49 may also include a pager, telephone, personal digital assistant or other electronic data communication device.

In a general purpose communication system, the processor is typically a commercially available processor such as the well-known Pentium® processor available from the Intel Corporation. Many other processors are available. Such a processor usually executes an operating system which may be, for example, the Windows 95®, Windows 98®, Windows NT®, Windows 2000® or Windows XP® available from Microsoft Corporation, MAC OS System X available from Apple Computer, the Solaris Operating System available from Sun Microsystems, or UNIX available from various sources. Many other operating systems may be use.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

Overview of Components

Figure 2:
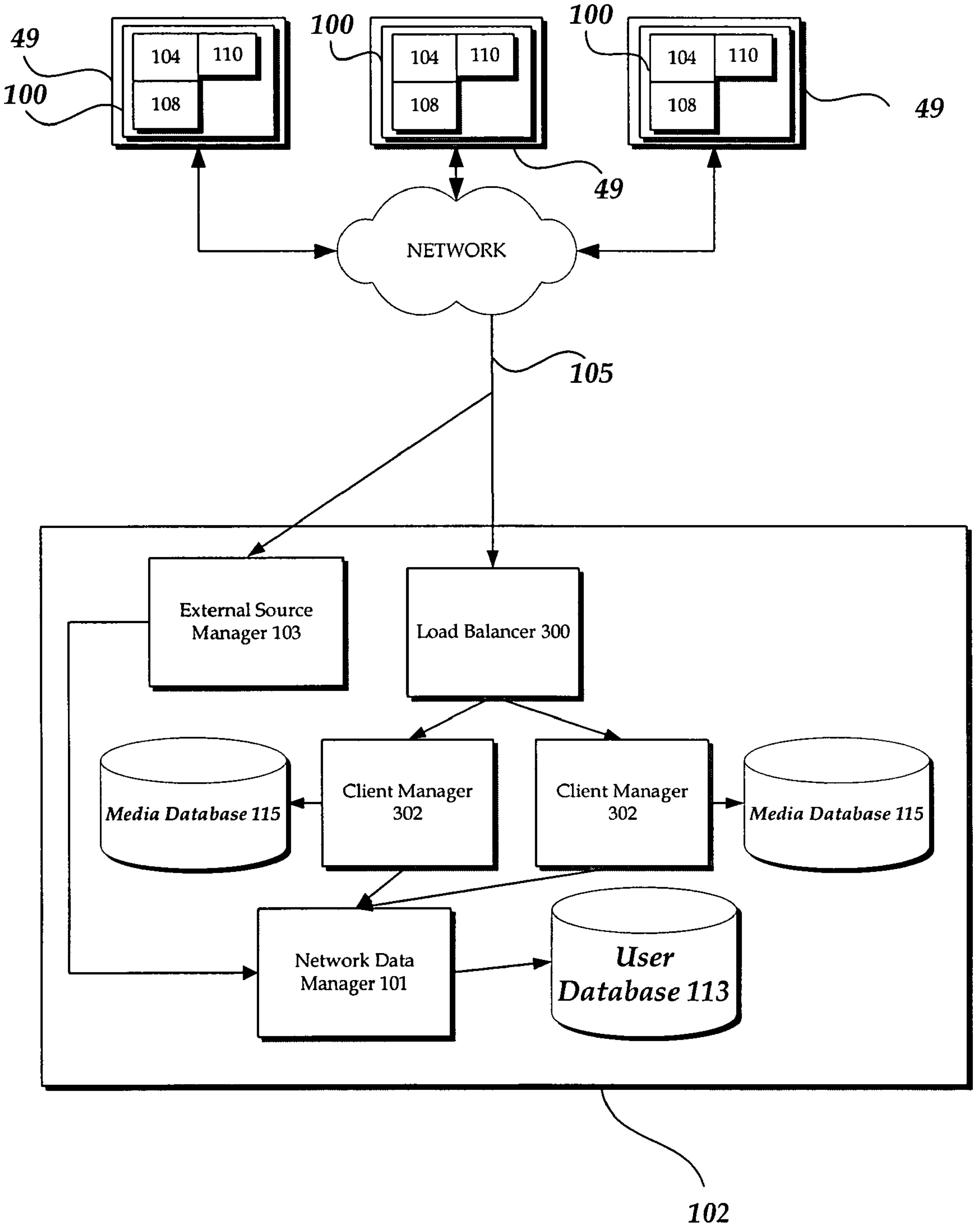
FIG. 2 is a schematic depiction of an example network environment having a user component and a network manager in an embodiment of the invention.

FIG. 2 schematically illustrates an exemplary network environment including a network manager 102 in connection with multiple user components 100 through a communication link 105 such as the Internet. The user component 100 may communicate requests and media objects from the user to the network manager 102, and the network manager 102 may store the uploaded media content and respond to requests from the user component. The user component 100 may also support the display and navigation of the users and/or objects within the network manager.

As shown in FIG. 2, the network manager 102 may include load balancer 300, client manager 302, network data manager 101, external source manager 103, user database 113, and media database 115. As shown in FIG. 2, the network data manager 101 may be in communication with the external source manager 103, the client manager 302, and the user database 113. The client manager 302 may be in communication with the user component 100 through the load balancer 300, the network data manager 101, and the media database 115, as shown in FIG. 2. The user component 100 may include a user input tool 110, a network map manager 104, and a tailored view manager 108.

It is to be appreciated that although the network manager and the user component are discussed herein as separate processes, any component or function of the network manager may be provided by the user component, and conversely, any component of the user component may be provided by the network manager. Moreover, it is to be appreciated that other network manager configurations may be appropriate, such as more than one network data manager 101 may support the network manager, the external source manager 103 may communicate with the network through the load balancer 300, the network manager 102 may not include a load balancer, the network manager 102 may have one or more client managers 302, and each client manager 302 may share a single media database 115.

Initialize User Component

A user may be invited to the network environment by an existing member of the network and/or may request entry to the network through a suitable request process. The network manager 102 may communicate to the user any combination of information to facilitate access to the network manager including a network identifier identifying the particular network environment to be accessed by the user, a unique user identifier identifying the user, and/or a user verifier such as a password, cookie, or any other suitable verifier.

After initial user registration, the network manager 102, through the client manager 302, may provide the user component 100 to the user system, such as user system 49 of FIG. 1. The client manager 302 may provide the user component 100 using any suitable method including application download, Flash objects, GIF images, applets, and the like. The user component 100 may be a one time download, a download at each time the user registers/enters the network manager, and/or may be a dynamic download of information throughout the interaction between the user and the network manager. The user component may also be provided to the user in other ways such as on distributable media, e.g., CD ROMS and the like. The user component 100 may then access the network manager 102 through communication link 105, such as through a universal resource locator ("URL") or a domain name of a web page using a web browser application. The network manager may limit or control the size of the network environment membership by allowing each user a predetermined number of invites in a specified period of time.

Upload Content

To upload content to the network manager 102, a user input or authoring tool 110 of the user component 100 may allow users in the network environment to post previously created media objects to the network manager 102, such as to the media database 115. The user input tool 110 may allow users to create and integrate media, such as text, video clips, pictures, and sound bytes such as music or voice within the network manager 102 to share media and tell stories online. In an exemplary embodiment, all media is published to the network manager 102 and is accessible by any member of the network through the network manager 102. An individual may add or modify their personal content and/or content posted by other members of the network. For example, an individual may upload pictures and music, add comments to their own or others' uploaded content, add links between media objects posted by the individual or others, and/or write text and/or place pictures in web logs. As each user in the network adds new material and comments on material added by others, the community of users will create a web of content in the network manager. The network manager may limit or control the size of the web of content by limiting the number or size of uploaded media objects for each user over a specified period of time or in any other number of other ways.

The user component 100 may include an upload tool of the user input tool 110 which may collect media content from the user, and forward that information to the network manager 102. The network manager 102 may store information, including uploaded media objects, associations between stored media objects, associations between stored media objects and users, and/or associations between users in a database. The upload tool may be accessed through a button, menu or the like, such as button 188 of the user display shown in FIG. 5. As shown in FIG. 2, the network data manager may store metadata such as associations between objects and users in a user database 113 and may store media objects in a media database 115. The client manager 302 may receive the uploaded media object in any suitable format and may store the media object in the media database 115 and may store any associated metadata in the user database 113 through the network data manger 101.

As shown in FIG. 2, the network manager 101 may have a plurality of client managers 302 to manage the load of requests from multiple users. Each client manager 302 may access a single central media database. However to facilitate speed and/or access, each client manager may have an associated media database 115. In this manner, to ensure synchronization of the content, the network manager 102 may store the uploaded content in each media database 115 associated with the plural client managers 302.

Client Manager and Load Balancer

The client manager 302 may receive requests and or media objects from the user component 100 through a load balancer 300, as shown in FIG. 2. As each user sends a request to the network manager 102, the load balancer 300 may distribute the activity across two or more client managers 302 in order to reduce overloading any one client manager with too many requests from a plurality of users. The load balancing may be either static or dynamic, e.g., the load balancer 300 may assign the appropriate client manager 302 based upon a particular user identifier or a particular network identifier, or may assign the appropriate client manager based upon the time that the request is made and the existing or expected load on the client managers.

The client manager 302 may determine which relationship network, e.g., set of associated members and objects managed by the network data manager 101 is to be accessed by the requesting user component based upon a network identifier and/or a user identifier. The client manager 302 may also verify the user with a user identifier and/or user verifier.

Similarity Metric

To help individual users filter and sort through the network of users and the web of content, the network data manager 101 of FIG. 2 may provide a similarity metric to sort and/or arrange user icons in a network map and/or the media objects and user icons in a tailored view. The similarity metric may be based upon similarity information such as co-occurrence information, linkages and/or transaction histories. The similarity metric may be determined from the metadata in the user database 113 and/or the media objects of the media database 115. The determined similarity metric may cause members, stories, and/or pictures to be displayed to a given user if they were posted by and/or reference other members that the given user cares about. In this manner, the network manager 102 may allow users to re-experience events and collectively build stories around the event with the other members of the network.

Query Tool

The user component 100 may request stored data through the user input tool 110 which formulates requests for information from the network manager 102. As shown in FIG. 2, the user component 100 may communicate the query or request to the client manager 302 in an XML format or any other suitable data format. In response, the client manger 302 may communicate with the network data manager 101 to determine the associations between users and media objects in the user database 113, and then access the appropriate objects from the media database 115. The client manager 302 may convert the communicated information to a format suitable for the network data manager, such as a SQL, XML or any other suitable format. In one embodiment, an XML to SQL server database persistence layer may be used to allow for lower processing costs of creating additional properties of objects in the database, easier maintenance of relationships among objects, and/or more efficient browsing of objects with specific properties. Accordingly, the network data manager may receive the communication, such as a query from the client manager and may execute the query against the metadata stored in the user database 113 and/or the media objects stored in the media database 115. Based on the communication or request, the network data manager 101 may select stored media objects, and based upon a determined similarity metric, may filter those objects. The network data manager 101 then sends the objects or pointers to the media objects, through the client manager 302, to the user component 100. The objects or pointers may be received by the user component in any suitable format, such as XML.

Display

The user component 100 may display the received media objects or icons representing those objects to the user with a network map manager 104 and/or a tailored view manager 108. The network map manager 104 may receive network member information and/or metadata such as similarity metrics between members to provide a network map of network members associated with a selected, or focal point member. The tailored view manager 108 may receive media objects (or pointers to those objects) and metadata such as the associated similarity metrics between media objects and/or members selected by the network data manager 101. The tailored view manager may provide the received information to the user in a view tailored to the requesting user, the query terms, and/or similarity metric data. To facilitate a user's view of the media objects stored in the network manager, the user component 100, through a tailored view manager may automatically provide a tailored view to a user when the user first accesses the network manager. The provided tailored view may have any suitable format including a map, collage, list, web log, and the like.

Network Map Manager

To facilitate a user's view of the members of the network, the user component 100, through a network map manager 104, may automatically provide a network map to a user when the user first accesses the network manager. The network map manager 104 may display a map of user icons which represent members of the network. The network map manager 104 may also display or indicate links between the user icons to illustrate relationships between members of the network. Additionally or alternatively, the network map manager 104 may selectively place user icons in the map display relative to other user icons to indicate a relationship and/or depth of relationship between members in the network. The network map manager may display the network map in relation to a specified user; for example, the network map manager may display the network in relation to a specified user as a focal point with selected members selectively arranged around the focal point user icon.

Figure 3:
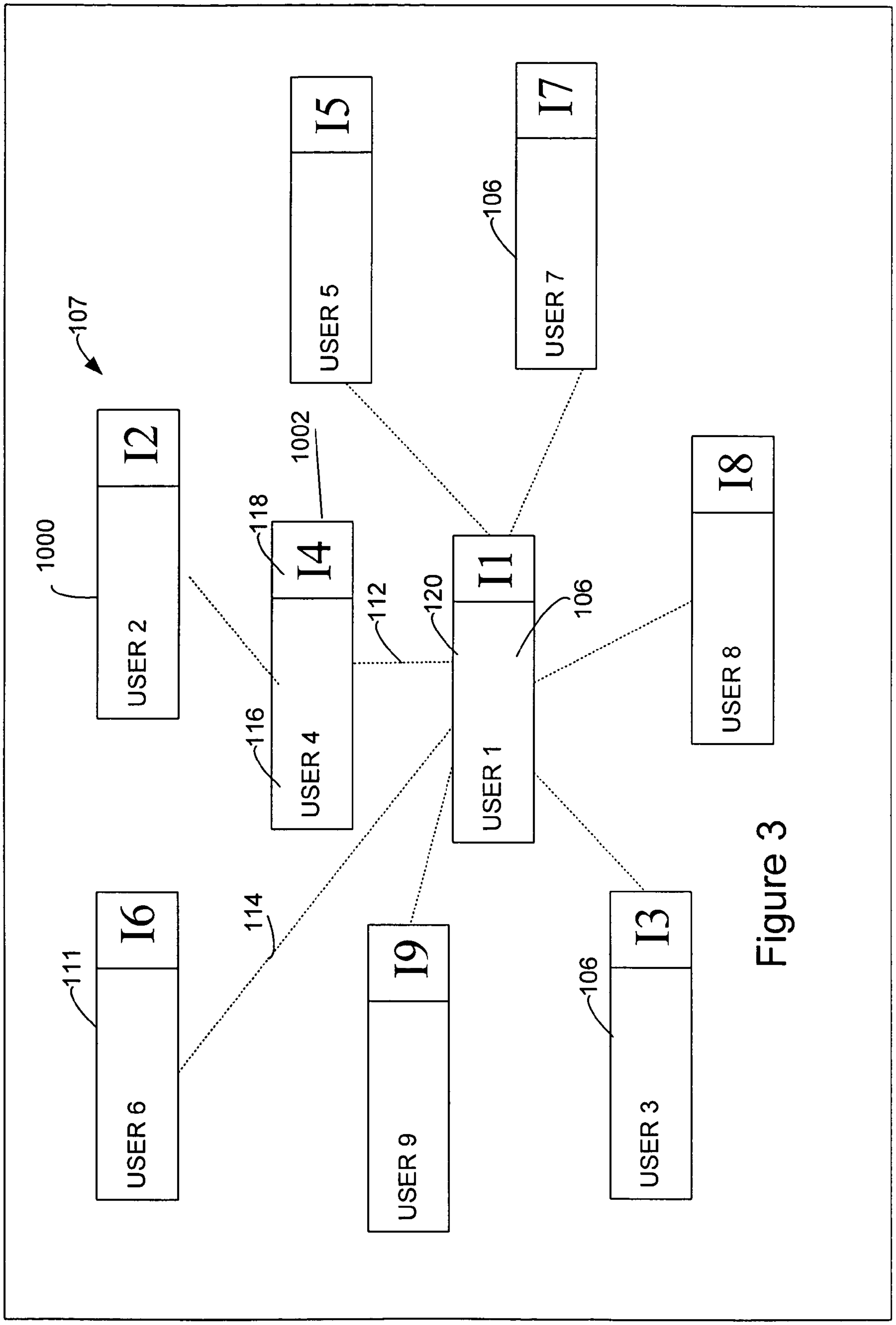
FIG. 3 is an example illustration of a network map display of the user component of FIG. 2.

FIG. 3 illustrates an exemplary network map 107 as displayed to a user by the network map manager 104 through the user component 100 of FIG. 2. A default network map display may center the network map 107 on a user icon representing the current user (the focal icon 120) and display the connectivity or relationships between that member and other members of the network.

In an exemplary embodiment of FIG. 2, the network map manager 104 may access the network data manager 101 to determine a user-user similarity metric based upon data associated with the focal icon 120 and data associated with the other user icons 106 in order to select the user icons to display in the network map 107. The network map manager may display all or a portion of the other members of the network based upon the user-user similarity metric of each member with respect to the user represented by the focal icon. An indication that undisplayed data exists may also be displayed to notify the user of the fact and/or allow further access to undisplayed data. In this manner, the network map manager may use the user-user similarity metric to select which user icons to display in the network map.

In the embodiment illustrated by FIG. 3, the network map 107 shows the users 106 that are associated with a given or focal user 120 (i.e., the network map shows the users in the focal user's network). In this manner, the network map manager displays only those members which have a connection or similarity to the user associated with user icon 120 based upon the user-user similarity metric of those members.

The user-user similarity metric determined by of the network data manager 101 may also be used to determine the placement of the selected icons around the focal point in the network map. For example, the network map 107 display of FIG. 3 may indicate the strength of similarity between members with an indicator. The indicator may include different colors, thicknesses, line styles, line intensities, line lengths of the displayed connection or link between members, location on the display (e.g., more similar objects placed near the center or at the top of the display), and/or any other suitable indicator of the degree or strength of similarity between members of a network. For example, the network map manager 104 may adjust the length of the line connecting two members to illustrate the strength of similarity between users; a relatively short distance between icons on the map may indicate high similarity between the users and a relatively long distance between icons on the map may indicate low similarity between the users. In the example of FIG. 3, the similarity or connection 112 between USER 1 (the focal point) and USER 4 is relatively high when compared to the similarity 114 between USER 1 and USER 6.

The network map may display each selected user icon and directly connect or link those icons to the focal point icon 120 and/or to other user icons. Alternatively, the network manager may display selected users, directly connecting more similar users to the focal point and connecting less similar users through other users, or may indicate indirect relationship to some members through other members. For example as shown in FIG. 3, the user represented by user icon 1000 may be connected or related to the focal point icon 120 through the user represented by icon 1002.

User Icon

The user icon of the network map display may be a generic icon such as a box or head shape, or may display data and/or objects associated with that member as determined by the network data manager 101. For example, each or a selected number of the user icons of the network map may include any suitable identifying information to indicate the corresponding member associated with that user icon. In the network map display of FIG. 3, each user icon of the network map 107 comprises a textual portion 116 and an image portion 118, forming a brief user profile. The textual portion 116 may include text that is associated with the corresponding user such as name, contact information including e-mail address and/or phone number, hobbies, interests, preferences, and/or any other suitable information associated with a member. The image portion 118 may be a photograph of the corresponding user or any image associated with the user. The text portion 114 and/or image portion 118 associated with a user icon in the network map 107 may be determined by the member represented by that user icon or the user accessing the network manager. Alternatively, the network manager may assign the text portion 114 and/or image portion 118 associated with a user icon based upon factors such as common content used to describe the user and/or popularity of content associated with the user.

Navigate Network Map

The network of members may be navigated by selecting a user icon in the network map 107 of FIG. 3. The network map manager 104 may re-center the network map by placing the selected icon as the new focal point in the center of the map 107. Based on the new focal point and user-user similarity metric information from the network data manager, the network map manager may select and arrange the icons of the most similar users around the new focal point and may link some user icons through other displayed user icons. In this manner, a user may view the network map from the point of view of any selected user icon representing a member of the network.

In Operation

For example referring to FIG. 2, USER 1 may access the network manager 102 and the default network map display may illustrate the network map 107 shown in FIG. 3 with USER 1 illustrated as the focal point 120 in the center. Using the user-user similarity measure of the network data manager 101, the network map manager 104 may display all or a portion of the other members of the network based upon the similarity metric determination and may arrange the icons around the USER 1 focal point 120 such as the network map shown in FIG. 3. USER 1 may then select a new focal point for a new network map by selecting a displayed icon, such as user icon 111 representing USER 6. The new focal point may be selected using any suitable method, such as by clicking the desired user icon in the network map, entering a user name or other identifying information into a network map data field (not shown), or by any appropriate request method. In response, the network map manager 104 may display the new map with the selected user (USER 6) as the focal point and apply user-user similarity metric information from the network data manager 101 of FIG. 2 to select and/or arrange other members around that focal point. Depending on the level of similarity, USER 1 may or may not be displayed in the new network map. More particularly, USER 6 may have relationships or similarities to other members that are more significant than the relationship between USER 1 and USER 6. In this manner, USER 1 can view the network from the point of view of USER 6 or any other selected member.

Input Tools

In an exemplary embodiment, the network manager 102 includes a variety of user input or authoring tools 110 through the user component 100 that allow users to post content to the network manager. Examples of authoring tools include an image region tool, a text region tool, a comment tool, a link tool, a web log posting tool, and a user identification tool. In an exemplary embodiment, the user input tool 110 allows users to create a wide variety of content within the network environment.

Image Region Tool

Figure 11:
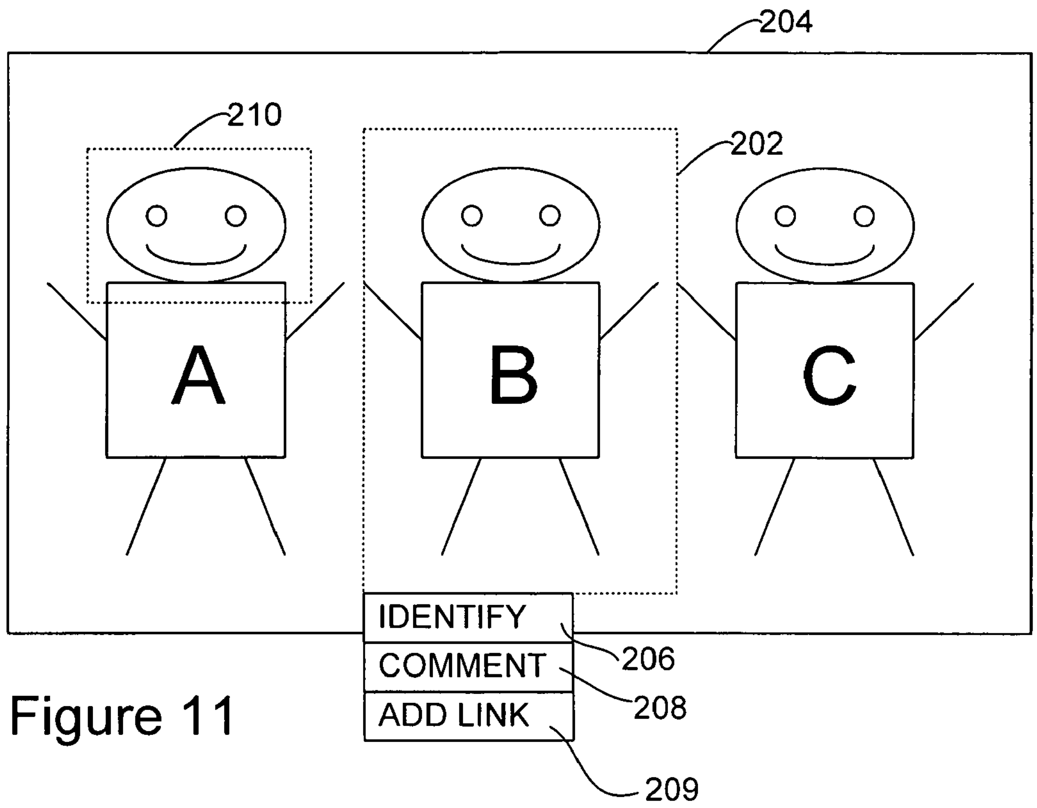
FIG. 11 is an example illustration of an image region tool display of the user component of FIG. 2.

An image region tool may allow a user to select a portion of a posted image as an object to be associated with another object or user. FIG. 11 illustrates an example operation of an image region tool on a digital photograph. The image region tool may allow a user to select individual areas of interest 202, 210 such as faces within a digital photo 204 or other 2d visual images. The area of interest may be selected by any suitable method including clicking and drawing an enclosed polygon or free form region around the area of interest, clicking and dragging along a diagonal to form a box overlying the area of interest, selecting by color, selecting by feature in an image and the like. Once an area of interest is selected, the image region tool may show (either automatically or through some user interaction such as a right click) a selectable menu or template of actions which allow the user to perform various tasks such as identify 206 the area of interest, comment 208 on the area of interest, and/or add a link 209 to some other object in the network manager. The regions 202, 210 created by the image region tool may allow intelligent cropping/zooming 210 without altering the original media to create new media objects. In this manner, a user may identify and/or upload portion of a media object, such as 'representative' media for an individual in order to create a profile photo or for some other purpose.

When identifying a member in an image, the image region tool may provide or access a member list of user identifiers. The user may select a particular listed member to be associated with the selected image area. Alternatively, the user may enter free text into a comment field which may provide a personal comment or identify of the member in the image. The image region tool may communicate the selected image area and the added text or link to the network manager 102. Data added by the image region tool may become a property of the image object itself, or alternatively may be an independent object associated with the image by the network data manager through metadata.

For example, the network data manger 101 as shown in FIG. 2 may store the added text/link as a separate media object in the media database and associated metadata in the user database. The metadata may include the identity of the user selecting a portion of the image, the action (identify, comment, link, etc.) taken by the user, and/or the user identified in the image.

The network data manager may recognize non-standard name identities in comments and labels and prompt the user to identify which network member is identified. Alternatively, the network data manager may recognize non-standard name contributions based on repeated uses of non-standard names and may automatically associate the metadata identity with the appropriate member. For example, a user identity may be Robert R., however, the network data manager may also recognize Bob R., Bobby, and/or 'Robber' based upon common nicknames indicated by the user and/or previous media object labels or comments created by members of the network. In this manner, the network data manager may associate those nickname uses with the member identified with Robert R.

Information associated with the object, such as an identifying label may be used in any of the similarity metric determinations. For example, a user-user similarity metric may indicate a first user is similar to a second user based upon a determination that the first user can identify the second user in an image. Similarly, the network data manager may associate a first user and second user with a user-user similarity metric by recognizing that the first user is willing comment on or link to images or other media objects posted by the second user. The network data manager may determine a user-object similarity metric between the object and the user labelling the object. In another example, the network data manager may determine an object-object similarity metric based upon a similarity between the labels of the objects.

Comment Tool

A comment tool of the user input tool 110 may allow a user to add or attach a comment to any other object. The textual comment may be a personal observation of the selected portion of the image and/or may identify the person, object, event of the selected portion of the image. The comment tool may allow messages or labels to be added to all types of media, such as images, sound bytes, web log entries, and user icons.

The comment itself may be any type of media object, such as block of text, a sound byte, an image such as digital 'ink', and the like. By adding a message to a media object, a user may create a conversation in the context of any type of media object.

Figure 5:
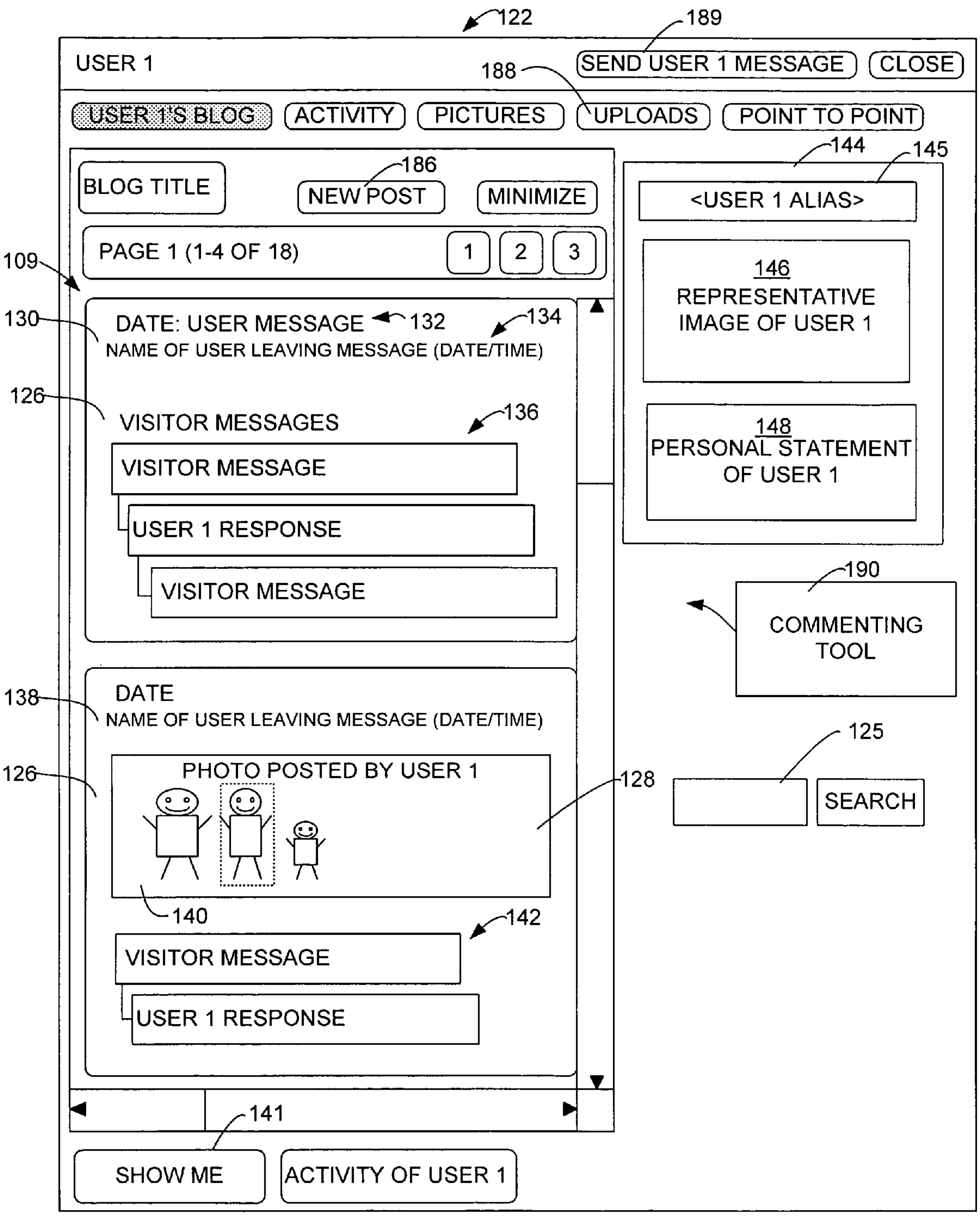
FIG. 5 is an example web log view display of the user component of FIG. 2.

The commenting tool may be accessed through a button 190 available on an existing web log, such as the web log view 122 shown in FIG. 5 or may be accessed through any other suitable selector such as a menu, right clicking on an object, and the like. For example, a user may select a portion of a posted image with the image region tool as shown in the displayed image 128 of the web log of FIG. 5. In one embodiment, the commenting tool is not a permanent icon as illustrated by FIG. 5, but automatically appears when a cursor hovers over a displayed media object. When accessed, the comment tool may start a template dialog to allow a user to attach a comment such as a message or label to an object in the web log 109. The comment may become a property of the media itself, or alternatively, may be an independent object associated with the media object by the network data manager through metadata. The added comment may be viewed as a media object attached to the image and/or may appear when the mouse pointer hovers over the selected portion of the image.

Text Region Tool

Figure 12:
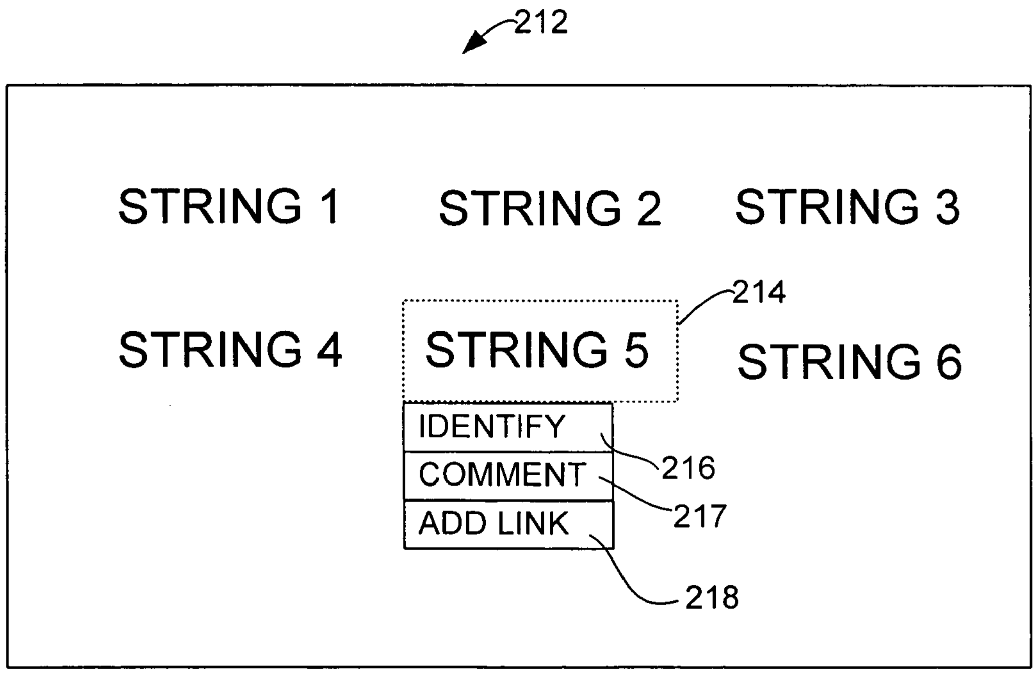
FIG. 12 is an example illustration of a text region tool display of the user component of FIG. 2.

The comment tool may also include a text region tool that allows a user to select a portion of text and attach a comment to that text. FIG. 12 illustrates an example operation of a text region tool on a block of text 212. Similar to the image region tool, the text region tool may allow a user to select a character string 214 of any media object posted in the network manager and identify 216 the string, comment 217 on the string, and/or add a link 218 to some other object in the network manager to the string. The comment data may become a property of the text string, and like the comments to images, may also be used in the similarity measure of the network data manager 101.

Link Tool

A link tool of the user input tool 110 may allow a user to attach or associate a series of objects to form a story trail. The link associations may be stored and managed by the network data manager 101 as metadata to provide a web of content as well as similarity metric information. The link tool may provide an input template or dialog to the user and communicate the association to the network data manager. The link tool may include a time stamp field, an author field, a title field, and/or any other suitable field, any of which may be pre-populated by the link tool. The linked objects may form a new story object (e.g., a media object formed from a plurality of existing media objects) or the network data manager may associate a series of objects with metadata, or with an object-object similarity metric.

Using the link tool, the user may specify a link for each object to a previous or next object to create a story trail. In one example, a user may view the picture 128 of FIG. 5 and add a link to an object posted by another user, such as a picture showing the same people of image 128, of the same event, and the like. The link may be displayed as a button, icon, or any other suitable indicator that may lead a user to another object in the network.

Web Posting Tool

A web log posting tool of the user input tool 110 may allow a user to enter media in a journal entry format. The web log posting tool may use a web log template which has a time stamp field which may be automatically pre-populated and/or determined by the web log posting tool, an author field which may be automatically pre-populated by the web log posting tool, a title field, a drawing field, and/or any other suitable field. The drawing field may provide a new document field in which a user may enter text, drag in media objects such as images, highlight text, and/or add links.

The web log posting tool may be accessed through any suitable selector such as a button, menu, and the like. As shown in FIG. 5, a 'new post' button 186 may be available on an existing web log view 122. Additionally or alternatively, the user may upload media objects such as photographs, music, video clips, links and the like to the web log by accessing the user upload tool 110 through any suitable activator such as upload button 186, a pull down menu, automatic appearance when the cursor hovers over a blank area of the web log, and the like. The web log posting tool may allow a user to lay out media in any format, create galleries, posts, play lists, etc.

The web log posting tool may communicate the media object and metadata such as time stamp and author to the client manager 302 of FIG. 2. The uploaded media object may be stored by the network data manager in the media database 115 of each client manager 302, and the metadata associated with the media object may be stored in the user database 113.

Email Tool

An email tool of the user input tool 110 of FIG. 2 may allow users to send an email communication to another user associated with a selected media object. The email tool may be included in the user component or may access an independent e-mail application. For example, the email associated with a web log may be automatically addressed and/or sent to the owner of the web log and/or the author of a selected media object. Additionally, the network data manager may store the email as a media object associated with the web log and may further include the email as a part of the web log to create a conversation. The email tool may be accessed through a suitable selector such as button, menu, and the like. For example, as shown in FIG. 5, the tailored view 122 of the web log 109 may include a button 189 to access an email tool.

User Identification Tool

A user identification tool of the user input tool 110 of FIG. 2 may allow users to specify some basic information about themselves which may be displayed as a part of the user icon associated with that user by the network data manager 101 and/or in a user profile view (discussed further below). The user identification tool may provide a template or dialog with a user text field for entering user identification data including an on-line name, links to other members or objects of the network, and/or a personal statement which may include any media format such as a web log entry. The template may also provide a media field for entering any media type including a representative image such as a picture of the member. The user identification tool may provide the text and/or media information to the network data manager 101 of FIG. 2 for storage in the appropriate database and to be associated with a user identification with metadata. In this manner, the text data and/or media content may be associated with the identified user by the network data manager.

Query Tool

Users may search and retrieve content from the network manager to determine which posted data is displayed in a tailored view. Accordingly, the user input tool 110 of FIG. 2 may provide a variety of search options and/or functions through a query tool to allow a user to request a search of objects stored and/or posted at the network manager 102. The query tool may accept search parameters based upon the timeliness of the posted object, the subject of the posted object (such as person or event described in the object), the author or poster of the object, the popularity of the object, an event or other label or comment of an object, and the type of object (e.g., text, image, video, music and the like). The query tool may send those parameters with a query request through the client manager 302 to the network data manager 101 shown in FIG. 2.

The query tool may provide a front end for a query engine of a database manager in order to determine which members and/or objects meet the specified search parameters. For example, the query tool may send the search parameters to the network manager to perform the search on the objects and/or members stored in the network manager or alternatively, the query tool may send the search parameters directly to a query engine in a database. The network data manager may return the actual retrieved objects and/or links to the objects in the network manager storage to the user component 100 for display to the user, such as through the tailored view manager 108.

The network data manager may return a user-object and/or object-object similarity metric for each object selected in accordance with the search parameter. The similarity metric may be applied to a query/search result to limit and/or expand the information returned to the user. In some cases, the similarity metric may not be applied to search results to limit the information displayed, but still may be applied to determine or arrange how the search results are displayed by the tailored view manager.

More particularly, in response to the query parameters from the query tool, the network data manager may conduct a search of the metadata and/or content stored in the user database 113 and/or media database 115 and select objects based on the query parameters. The network data manager may determine a similarity metric for each selected object based on the metadata of the user database 113. The network data manager may use the similarity metric to return additional similar objects to expand the search. Alternatively, the network data manager may return only those objects similar to the search parameters and/or the requesting user to limit the search. Additionally, the network data manager may return the similarity metric to the user component for use in displaying the returned objects to the user. For example, a list of objects may be ordered in decreasing level of similarity and/or objects may be positioned or grouped based on the level of similarity to the query terms, the user providing the query and/or other objects. The tailored view manager may then allow the user to select one or more retrieved objects as the basis for a further search or to retrieve the media object for further review.

Predetermined Searches

Since searches can become fairly complex, “standing” or predetermined queries may be accessed through “show me” buttons 141 as shown in FIG. 5, or may be accessed through any suitable selector such as a menu. Example predefined searches may include:

i. Show me new stuff ii. Show me new stuff about me iii. Show me new stuff about me and my friends iv. Show me stuff I authored v. Show me popular stuff about a particular person vi. Show me popular stuff about a particular event vii. Show me stuff that me and my friends like viii. Follow a story ix. Show me a list of all the people in the network, and how popular they are When a standing query is selected by the user, the query tool may send the predefined search parameters to the network data manager. Alternatively, the query tool may send a predefined query request to the network data manager which may retrieve the appropriate search parameters from the user database.

Advanced Searches

Figure 4:
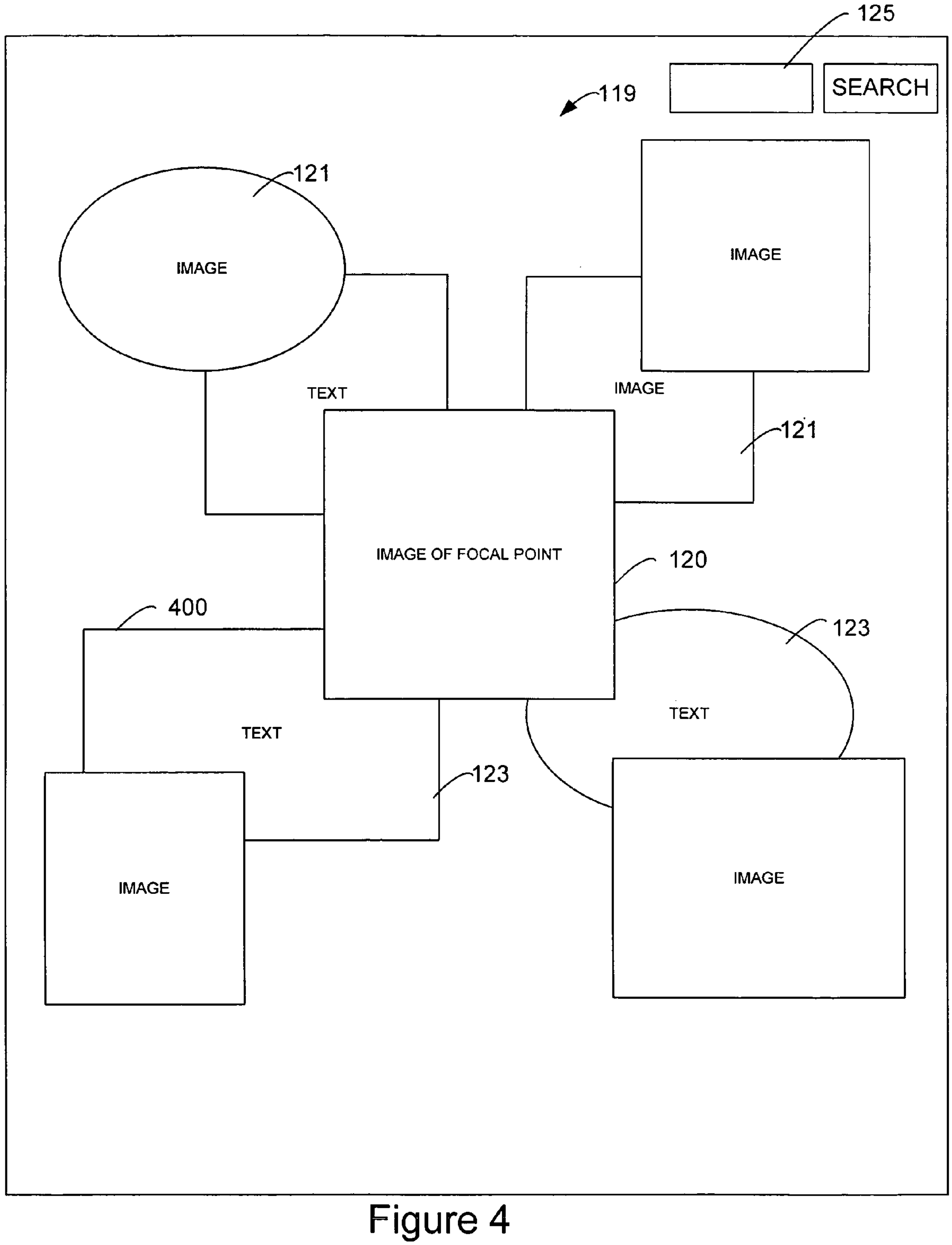
FIG. 4 is an example illustration of a collage view display of the user component of FIG. 2.

Advanced searches may be formed using a template 143 with a query field 125 provided by the query tool as shown in FIGS. 4 and 5. The query field may accept any suitable form of query parameters including search terms as well as indictors of fields and/or types of data to search. For example, a user interface or template may guide the user to enter the fields or metadata to be searched (e.g., author, title, date stamp), the types of data to be retrieved (e.g., user profile, image, music, web log), and/or any desired search terms. The field parameters may include, but are not limited to, network member, event title, author or poster of media, identified member in the object, time of object posting, type of media, and popularity. Moreover, the query tool may allow the user to search for objects or members based upon similarity metrics which may be computed through network data manager 101. The field parameters may be used individually or in any suitable combination to create advanced searches.

User Parameter

For example, the query tool may allow a user to enter a user parameter to search for ‘all’ network members and/or ‘me’ which may retrieve all objects pertaining to and/or posted by the user. The query tool may also allow a user parameter related to ‘me and my friends’ which may retrieve all objects pertaining to and/or posted by the user and the user’s immediate network based upon the similarity measure, and ‘list of names’ which may retrieve a list of all or a portion of the network members. The results of the user parameter search may be arranged by the tailored view manager in any suitable fashion such as alphabetically, geographically, popularity, similarity and the like.

Event Parameter

The query tool may allow a user to search for one or more specified events. For example, the network data manager may search for all objects pertaining to a specified event based upon comments, titles, and/or other metadata associated with the media object. The network data manager may also retrieve a list of events which may be arranged in any suitable fashion by the tailored view manager such as alphabetically, geographically, popularity, similarity and the like.

Author Parameter

The query tool may allow a user to search for one or more members of the network based upon the author or poster of the media. The author search parameter may allow the user to specify one or more specific members of the network by user name, first name, or any other suitable identifier. In this manner, the user may retrieve objects posted by one or more specified users. For example, the author parameter may be set to ‘all’ available authors, ‘me’ to retrieve objects posted and/or created by the user, ‘me and my friends’ to retrieve objects posted and/or created by the user and his immediate network based upon the user-user similarity metric of the network data manager, and ‘list of names’ to retrieve a list of all or a portion of the network members who have posted material. The retrieved objects or list of names may be arranged in any suitable fashion by the tailored view manager such as alphabetically, geographically, popularity, similarity and the like and presented to the user through the tailored view manager.

Object Type Parameter

The query tool may also allow a user to search and retrieve objects of a specified type such as the type of media in the object (text, image, video, sound byte) and/or the type of object itself (user profile, web log, series, story line). In this manner, the user may retrieve all pictures, all web logs for all users, or any other type of object.

Time Parameter

The query tool may also allow the user to specify the time or range of time of posting of the object. In this manner, the user may limit a search to retrieve only those objects which were posted within the specified time range. For example, the time parameter may be set to 'all' to retrieve all postings, 'since I last visited the site' to retrieve objects posted since the last time the user accessed the network manager, 'the last day' to retrieve objects posted within the last 24 hours and/or the since the previous day, 'the last week' to retrieve objects posted within the last calendar week, 'the last month' to retrieve objects posted in the last 30 days and/or the last calendar month, 'the last six months', and/or a specified date range with either one or both of an end date and a beginning date.

Popularity Parameter

The query tool may also allow a user to limit retrieved items having a specified level of popularity. The popularity parameter may include 'all' to retrieve all objects, 'stuff with the most hits' to retrieve objects that have been retrieved the most by other members, 'stuff with the most linkages' to retrieve objects that have been retrieved and linked by members to other objects. The popularity parameter may also include 'stuff with at least N hits' to retrieve objects that have been retrieved at least N times by other members, 'stuff with at least N linkages' to retrieve objects that have been retrieved and linked at least N times to other objects by members of the network. The popularity parameter may also include 'stuff with the most hits by me and/or my friends' to retrieve objects that have been retrieved by the user and/or his immediate network as determined by similarity metric information, and 'stuff with the most linkages by me and/or my friends' to retrieve objects that have been retrieved and linked to other objects by the user and the similar members of the network.

To support the popularity query parameter, the network data manager may count and store the number of hits to an object and/or the time of access to the object as metadata associated with the media object. The network data manager may also store as metadata, the identity of the member accessing the object.

Media Bin

In an exemplary embodiment, each user may have an associated media bin that by default may be a list view of content that person authored. Objects authored by other users may be 'dragged' or loaded into and out of the media bin by the owner of the media bin. The media bin may be accessed through any suitable selector, such as a button and the like. In some cases, the media bin may hold the media objects themselves. Alternatively, the media bin may be metadata associating a plurality of media objects with the media bin of a particular user. In this manner, the network data manager may automatically create metadata associating a posted object with the media bin of the author of the material. Moreover, a search of objects in the network may be limited to a search of a selected user's media bin.

Tailored View Manager

The tailored view manager 108 of FIG. 2 may provide a display of the results, e.g., the retrieved lists and/or objects, from the search performed through the query tool. The retrieved information may be opened and directly placed in the tailored view display and/or an icon representing a link to the retrieved object may be provided in the tailored view. For example, the tailored view manager may display user icons and/or object icons in a collage view, a network view, a web log view, a user activity view, a picture view, a list view, and/or a relationship view. The selection of the view type may be automatically selected by the tailored view manager based upon the information and/or objects to be displayed. Additionally or alternatively, the tailored view display may be selected by the user through the user component 100, such as through the query tool of the user input tool 110 and/or through the tailored view manager. For example, the query tool may allow a user to select of the resulting display of the retrieved information through a button or query result field, and/or the tailored view manager may provide a user interface, such as a button, menu or other selection device, to change the view displayed by the tailored view manager.

Collage View

FIG. 4 illustrates a collage view 119 of media 121 and text 123 that is selected for a focal user 120. In an exemplary embodiment, the tailored view manager may automatically generate the collage 119 of media 121 and text 123 for a user depending on the user and/or query terms from the query tool.

To produce the collage 119 in the embodiment illustrated by FIG. 4, the tailored view manager, through the network data manager 101 of FIG. 2, may select and/or arrange media objects stored in the network manager based upon the user-object and/or object-object similarity metric for each media object. The objects to be displayed, such as text, web logs, pictures, video, sound bytes and any other suitable media, may be retrieved from the network manager based upon a similarity metric determined by the network data manager 101 with respect to a selected focal point 120 and/or based upon query parameters or request from the query tool. If no query terms are entered and the collage view is selected, the tailored view manager may select the default focal point 120 as the user accessing the network and the displayed items may be objects and/or members similar to that user as determined by the network data manager. When a query term is entered, the focal point of the collage may be a user identified by the query or an object identified by the query.

Like the network map manager, the tailored view manager may select and/or arrange the displayed information around a focal point 120, however, the tailored view manager may display objects representing associated media as well as user icons representing members of the network. The user-object and/or object-object similarity metric of each object may be used by the network data manager to determine which objects to display in the collage view. In this manner, the network data manager may select and/or retrieve, and the tailored view manager may display, only those objects which have a connection or similarity to the user or media object associated with focal point 120.

The similarity metric may also be used to determine the placement of the selected objects around the focal point in the collage view. For example, like the network map 107 of FIG. 3, the collage view may indicate the strength of similarity between objects and/or user icons with an indicator. The indicator may include different colors, thicknesses, line styles, line intensities, line lengths of the displayed connection or link between objects and/or icons, foreground and/or background placement of overlapping objects, and/or any other suitable indicator of the degree or strength of similarity between objects and/or members of a network. For example, the tailored view manager may adjust the distance separating two objects to illustrate the strength of similarity between those objects and/or the focal point. In one example, a relatively short distance between an object and the focal point on the collage may indicate a relatively high similarity; and a relatively long distance between an object and the focal point in the collage may indicate a relatively low similarity.

Spiral Display

As shown in FIG. 4, the objects in a collage view may be arranged around the focal point 120 as arms of linked objects extending from the focal point. The objects may be displayed with overlapping edges to limit the size of the resulting collage. Moreover, the tailored view manager may use the similarity metric to determine which objects to place in the foreground and which objects to place in the background. Alternatively, the tailored view manager may place objects of a certain type (e.g., images) in the background and other images of a specified type (e.g., text or user icons) in the foreground.

The tailored view manager may select which arm to place the objects based upon query terms' specified by the user and/or the similarity metric. For example, each arm may represent objects meeting a selected a portion of the query parameters provided by the user. The tailored view manager may select which arm based upon the object type (e.g., one arm may be used for all returned images, a second arm may be all of the returned text and a third arm may be all of the returned video). The tailored view manager may determine the arms of the collage based upon other factors such as the author of the posted media, the people referenced in the posted media, and the like. The tailored view manager may alternatively group the objects based upon the object-object similarity metric between the objects themselves (e.g., objects similar to one another may be placed in a single arm).

The tailored view manager may position the returned objects in a particular arm based upon the similarity of those objects to the focal point. More particularly, those objects most similar to the focal point may be placed in the arm proximate to the focal point and conversely, those objects less similar to the focal point may be placed in the arm distal to the focal point.

To limit the display radius of the arms extending from the focal point, the tailored view manager may wrap the arms around the focal point to form a spiral centered on the focal point. The tailored view manager may determine a start radian for the arm at the focal point end of the arm and an end radian for the end of the arm extending away from the focal point. Each object may be positioned along the spiraling arm based upon a radius indicative of the similarity of that object to the object or user represented by the focal point. The tailored view manager may also determine the number of revolutions that an arm may make around the focal point, which may limit the object selected for display. In some cases, it may be suitable for any of the spiral display parameters (start radian, end radian, end radius, and revolutions) to be specified by the user as a display preference.

In operation, the user may enter a member's name using the query input field 125 and select the collage view as the tailored view for the results. In response, the user input tool may send the query to the network data manager which may run the search term of the user's name against the metadata and objects in the user database and media database of the network manager 102. The network data manager may return objects posted by the specified user, objects referencing the specified user, objects retrieved by the specified user, objects commented on by the specified user, and/or any other appropriate objects references or associated with the member's name. In this manner, the tailored view manager may display a collage view similar to that illustrated in FIG. 4 with the retrieved objects arranged around a user icon representing the specified member as the focal point 120. The objects placed close to the focal point may be more similar to the specified member than those objects placed farther away from the focal point.

An object displayed in the collage view may be retrieved for individual viewing by clicking on the representation of the media object in the collage view. For example, to retrieve a text object, the user may left click on the icon 400 of FIG. 4 representing the text. The actual text object may have been returned to the tailored view manager as a result of a search request and consequently, may be retrieved from memory for display. Alternatively, the tailored view manager may request the selected object from the network data manager through the client manager. The tailored view manager may then pull the text object to the foreground and may also increase the size of the displayed object to fill a window that can be as large as the window size available to the tailored view or beyond if scroll bars are used. In this manner, the user may comfortably read the text or review any object available in the collage view.

Web Log View

The user input tool 110 may allow users to provide updates to a web log regarding their activities, interests, and the like. The posted material may be displayed by the tailored view manager in a web log format, such as chronologically based upon similarity metrics between objects associated with the web log and/or as indicated by the user posting media content to the web log.

FIG. 5 illustrates a web log view 122 provided by the tailored view manager. The web log view 122 of FIG. 5 illustrates a web log 109 associated with USER 1. In an exemplary embodiment, the web log associated with USER 1 is automatically displayed by the tailored view manager 108 when USER 1 is the focal point 120 of the network map 107 (FIG. 3). For example as noted above, USER 1 is the focal point when USER 1 initially logs onto the network manager, when another user selects USER 1 from the network map, and/or USER 1 is the subject of a query.

The web lob view may display content posted by the user associated with the web log. The web log may also display comments, links, and/or replies posted by other members associated with objects within the web log. As noted above, the user input tool 110 may allow users to provide updates to the web log regarding their activities, interests and the like from time to time. The posted material may be displayed by the tailored view manager chronologically, based upon similarity metrics between objects associated with the web log, and/or as indicated by the user posting the media content to the web log. More particularly, the user posting the media object may specify the location and orientation of the media object within the web log display.

In the example of FIG. 5, a first post 130 includes a message 132 and a timestamp 134. The first post 130 also includes a log 136 of a conversation related to the originally posted message 132. In the example of FIG. 5, the second post 138 includes an image 140 and a log 142 of a 'conversation' related to the photograph. The conversation may be created by other users creating comments and/or links or by an electronic communication associated to the posted object such as message 132 or image 140. The user input tool 110 of FIG. 2 may allow a user to post a message associated with the viewed object and/or author of the object, such as a comment tool, email tool, and/or upload tool.

User Profile View

The tailored view manager 108 of FIG. 2 may also provide a user profile view illustrating information about a user as determined by the user identification tool. The user profile view may be an independent view and/or may be integrated into other views such as a portion of a user icon in the network map or the collage view, or as a section or viewing pane in a web log view or user activity view. For example, the user profile view may be displayed in conjunction with other display options by the tailored view manager. As illustrated in the web log view of FIG. 5, the web log 122 may include a user profile section 144. The user profile section 144 includes a user identifier 145, a photograph 146 of USER 1 and statement 148, such as contact information, interests, etc., about USER 1. The user profile view may be a separate view that is accessed when a user is selected from a menu or display object, such as an icon.

User Identity View

Figure 13:
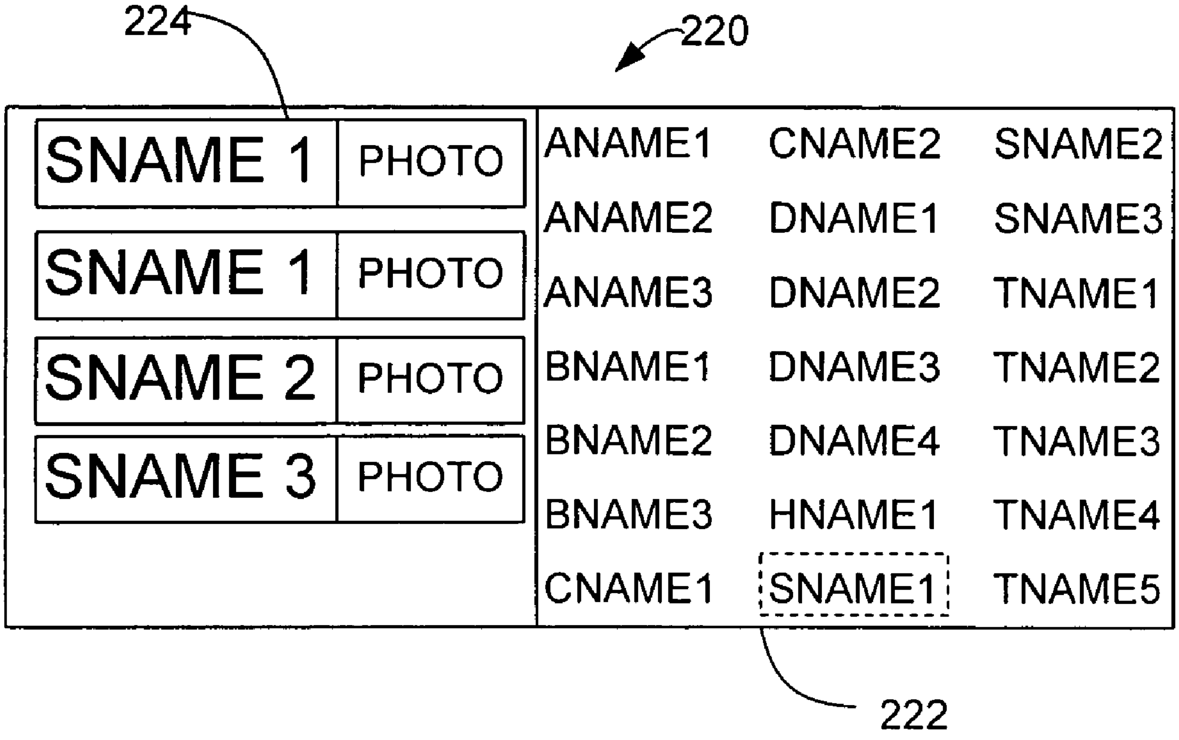
FIG. 13 illustrates an example user identification tool display of the user component of FIG. 2.

A user identification tool may help a user to identify a specific member of the network. FIG. 13 illustrates an example operation of the user identification tool on a plurality of user icons and/or user identities 220. The user identification tool may allow for easier use of first names and/or nick names. Moreover, the user identification tool may help a user manage name collision such as when several people have the same first name. For example, the user identification tool may coordinate with the network data manager to determine if the first name of a new user is identical to an existing user. If so, the user identification tool may ask the new user for an alternative name, alias, and/or may automatically provide an additional identifier with each user's first name, e.g., Bob 1 and Bob 2.

In some cases, the user identification tool may provide a 2d grid display 222 of all member names, which may be listed or displayed in a brief or icon form. A user may be allowed to select or 'zoom in' on a name, e.g., Bob 1, in the grid 222 and the identification tool may show a truncated user icon and/or complete user profile 224 of the selected name. To help a user distinguish between users with similar names, the identification tool may also show the user icons and/or profiles of names adjacent to the selected name. As noted above, the user icon and/or profile may include the full name and/or representative photos, contact info, etc. to allow a user to ensure that the desired user icon/user name is selected. The zooming feature may help users understand who a name/icon truly represents when a user adds a label or comment to an object. For example, the user identification tool may be accessed automatically through the image region tool to help the user identify the person in a selected region of an image.

User Activity View

The tailored view manager 108 of FIG. 2 may provide a view of a selected user's activity in the network. For example, using the query tool of the user input tool 110, a user may select a view tailored to display media objects that are associated with the selected user. The user activity view may be selected by the query parameters of a search request and/or through any suitable selector such as a button or menu, and the like. The displayed objects may be posted by the selected user, created by the selected user within the network manager (e.g., comments to other objects), referencing the selected user but created or posted by other members of the network, and/or accessed by the selected user. In the example activity view of FIG. 6, the user activity view 150 is based upon USER 1 and may be selected through button 153. The user activity view 150 may include a media object such as text 130 posted by USER 1, a photograph 140 posted by USER 1, a post 152 by another user that is related to USER 1, and a photograph 154 posted by another user that shows USER.

The objects selected and/or positioned in the activity view may be determined by the currency of the object. For example, more recent objects may be listed above less recent objects in a list or web log format or closer to the focal point in a collage view. Additionally or alternatively, the retrieved objects may be selected and/or positioned based upon the user-object and/or object-object similarity measure in any view such as a web log, list, and collage view.

Picture View

Figure 7:
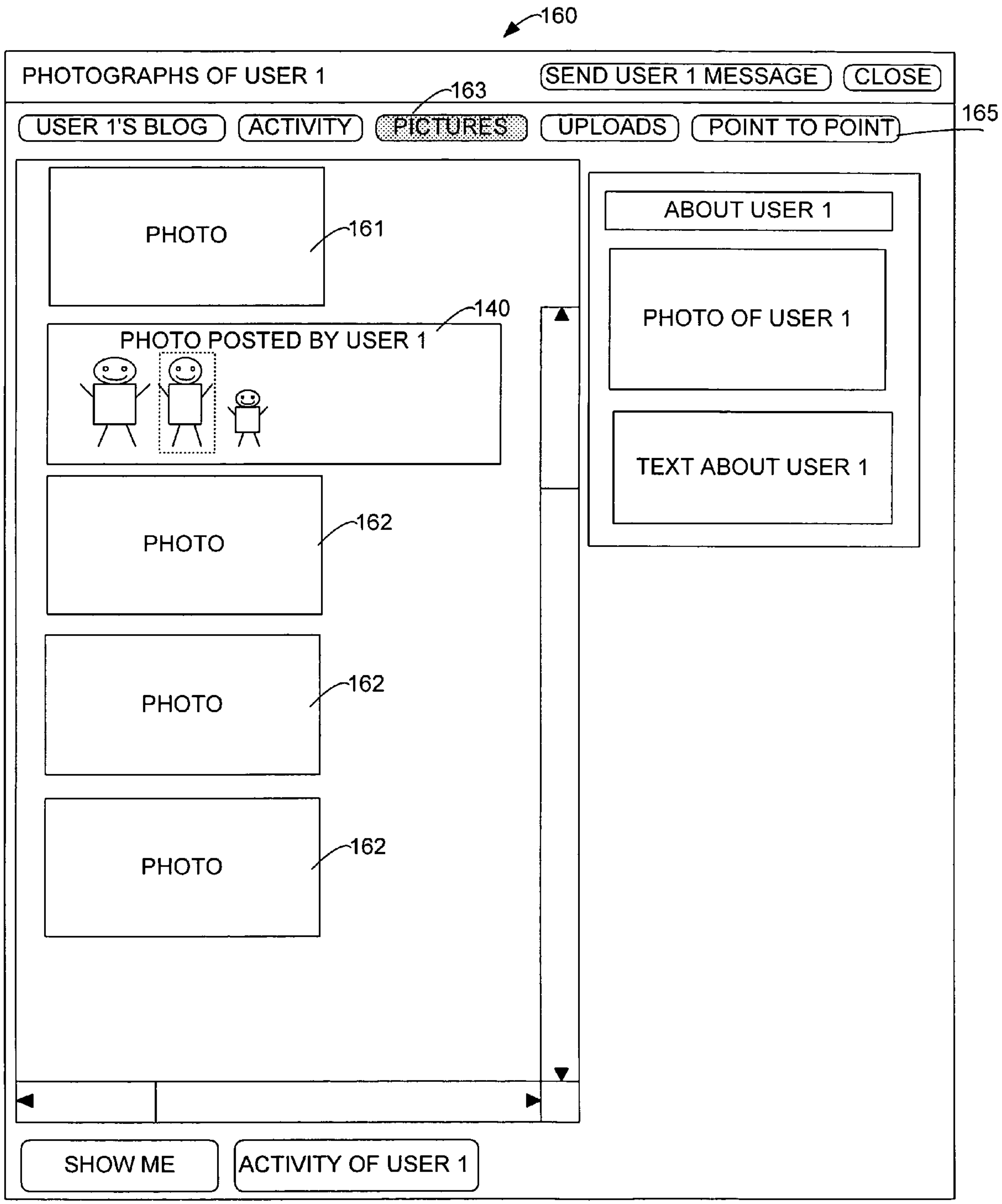
FIG. 7 is an example view of an image display of the user component of FIG. 2.

A user may select a view tailored to display pictures associated with a selected user using the query tool of the user input tool 110 of FIG. 2 and/or through any suitable selector such as button 163. The associated pictures may be selected by the network data manager 101 of FIG. 2 based upon a determined user-object similarity metric. The retrieved objects may include pictures that are posted by the selected user, include the selected user, or are otherwise related to the selected user, e.g., accessed by the selected user. The tailored view manager 108 may display the pictures in any default or user selected view including a web log, list, and collage. The user-object and/or object-object similarity metric may also be used to sort, group, and/or position the pictures such that more related pictures are positioned above other pictures in a list view, grouped with other similar objects, and/or or closer to the focal point in a collage view. In the example of FIG. 7, the picture view 160 displays pictures related to USER 1 in a web log format. As shown in FIG. 7, photograph 140 was posted by USER 1, and the rest of the photographs 162 shown on the view 160 were posted by other users, but are somehow related to USER 1 based upon a determined similarity metric. Picture 161 may be displayed at the top of the web log to indicate a higher degree of similarity, and the other pictures displayed below picture 161 may have less similarity to the selected user, USER 1.

Relationship View

Figure 8:
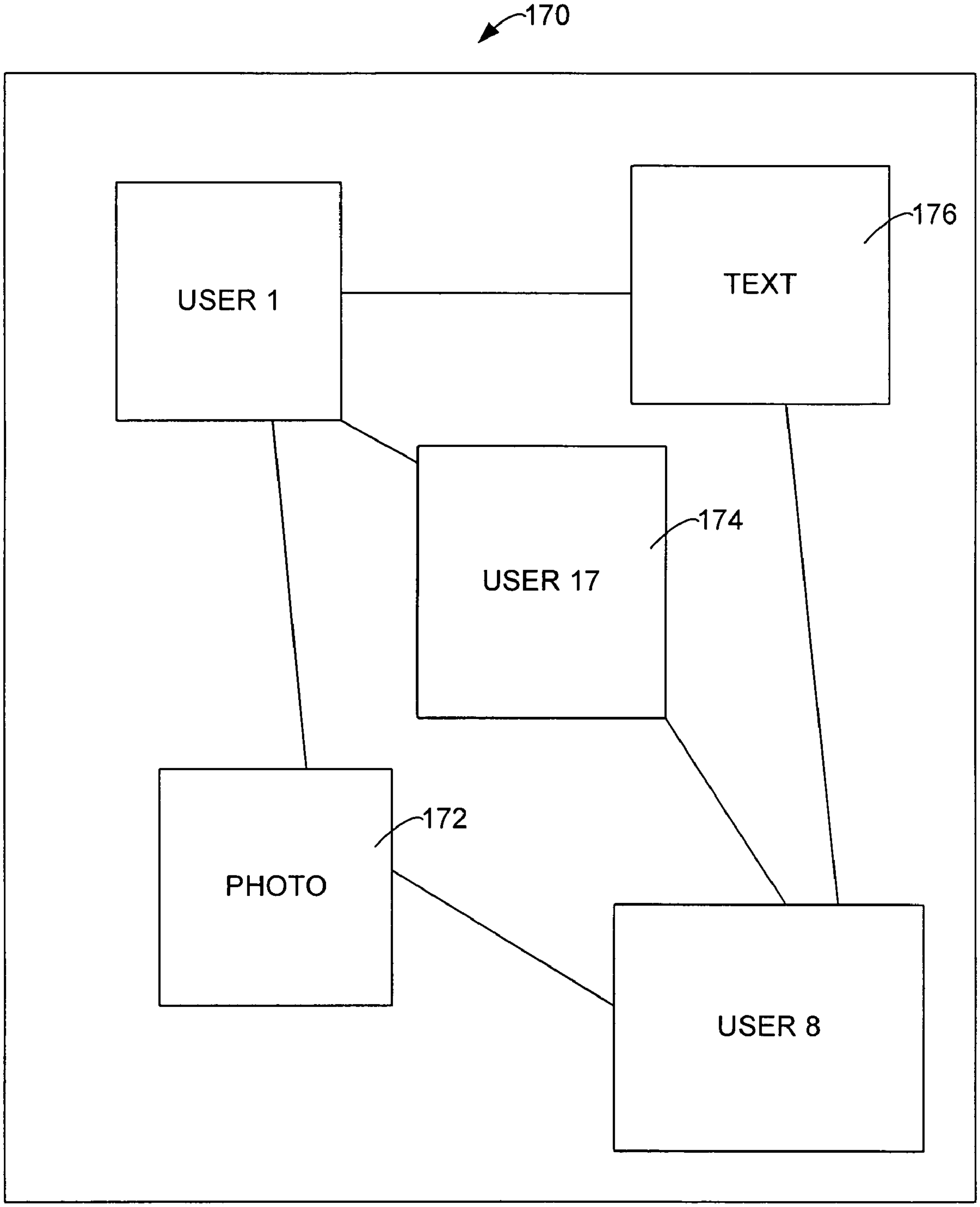
FIG. 8 is an example view of a relationship display of the user component of FIG. 2.

The tailored view manager 108 may provide a relationship view which includes an indicator of associations between two users of the network allowing users to explore how people in the network are connected. The relationship view may be selected by dragging one user icon over another user icon, a button such as button 165 of FIG. 7, or through any other suitable selector. The relationship view may allow a user to see how any two members are related, such as between the current user (self) and any other member or between any two members selected by the current user. The relationship view may show objects, links, associations, between the two selected users, such as pictures which include both selected network members, people related or similar to both selected network members, and/or conversations between the selected network members. The objects and/or members may be selected and/or positioned based on a similarity metric determined by the network data manager. An example relationship view 170 of FIG. 8 illustrates how USER 1 is related to USER 8. In the example of FIG. 8, USER 1 and USER 8 are linked by user icon 174 representing USER 17, had electronic conversation 176, and are both shown in photograph 172.

Recent Activity View

Figure 6:
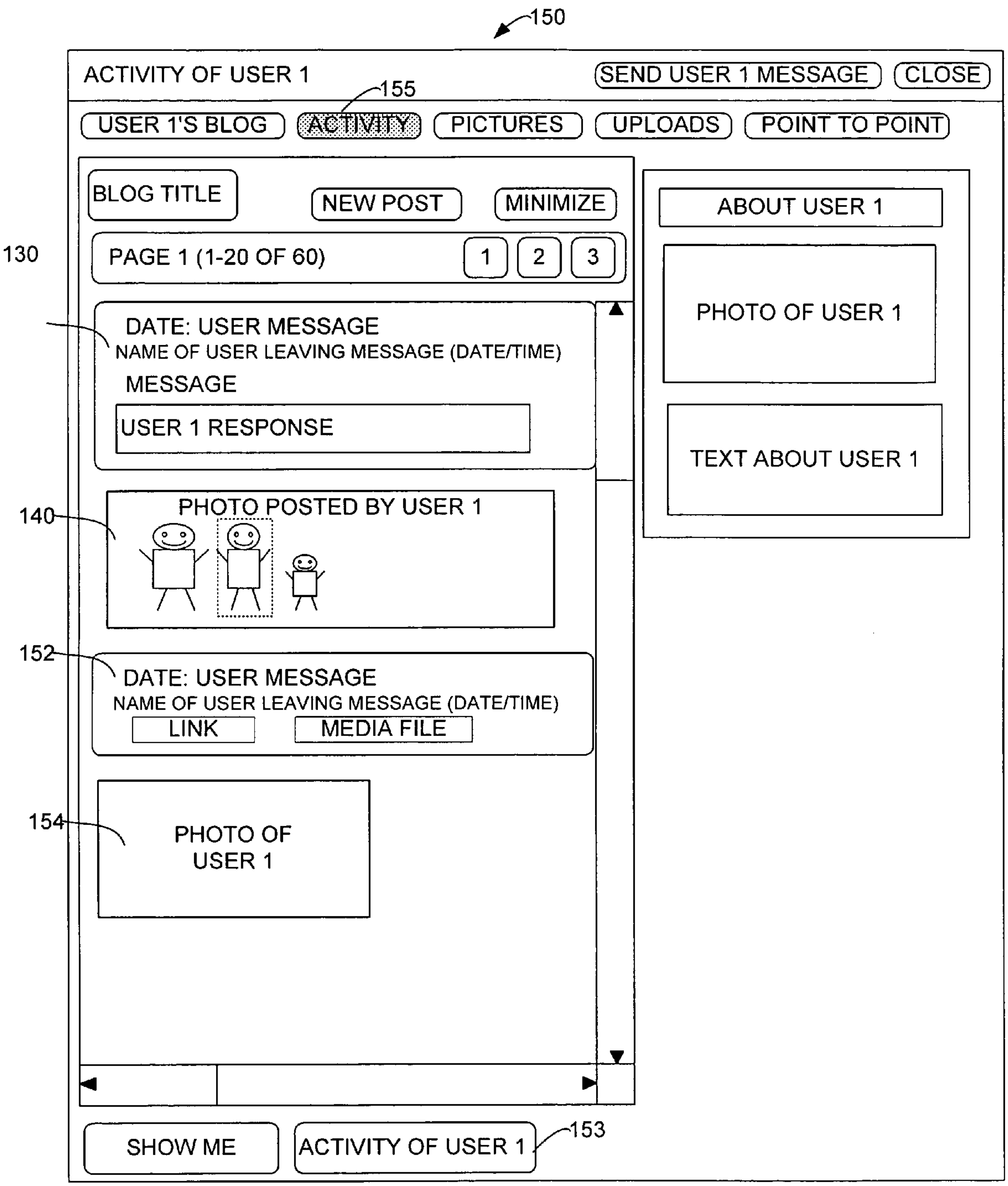
FIG. 6 is an example user activity view display of the user component of FIG. 2.

The tailored view manager 108 of FIG. 2 may provide a view of recent activity in the network. The recent activity may be selected as a resulting view of a query in the user input tool or through any suitable actuator such as a button, menu, and the like. As shown in FIG. 6, the recent activity of the network may be selected by clicking button 155. The recent activity view may display objects recently posted and/or accessed by users of the network such as pictures, text, videos, sound bytes, and the like. The network manager may select the appropriate objects to be displayed by the tailored view manager based upon posts within a predetermined time period, e.g., 24 hours, a time indicated by the user through the query tool, the time since the user last logged into the network manager, or any other suitable time limitation. The returned objects may be further limited according to a predetermined maximum number of objects, a maximum number indicated by the user, and/or a determined similarity metric, e.g., only those objects associated with a selected user, such as the requesting user, may be returned.

Figure 9:
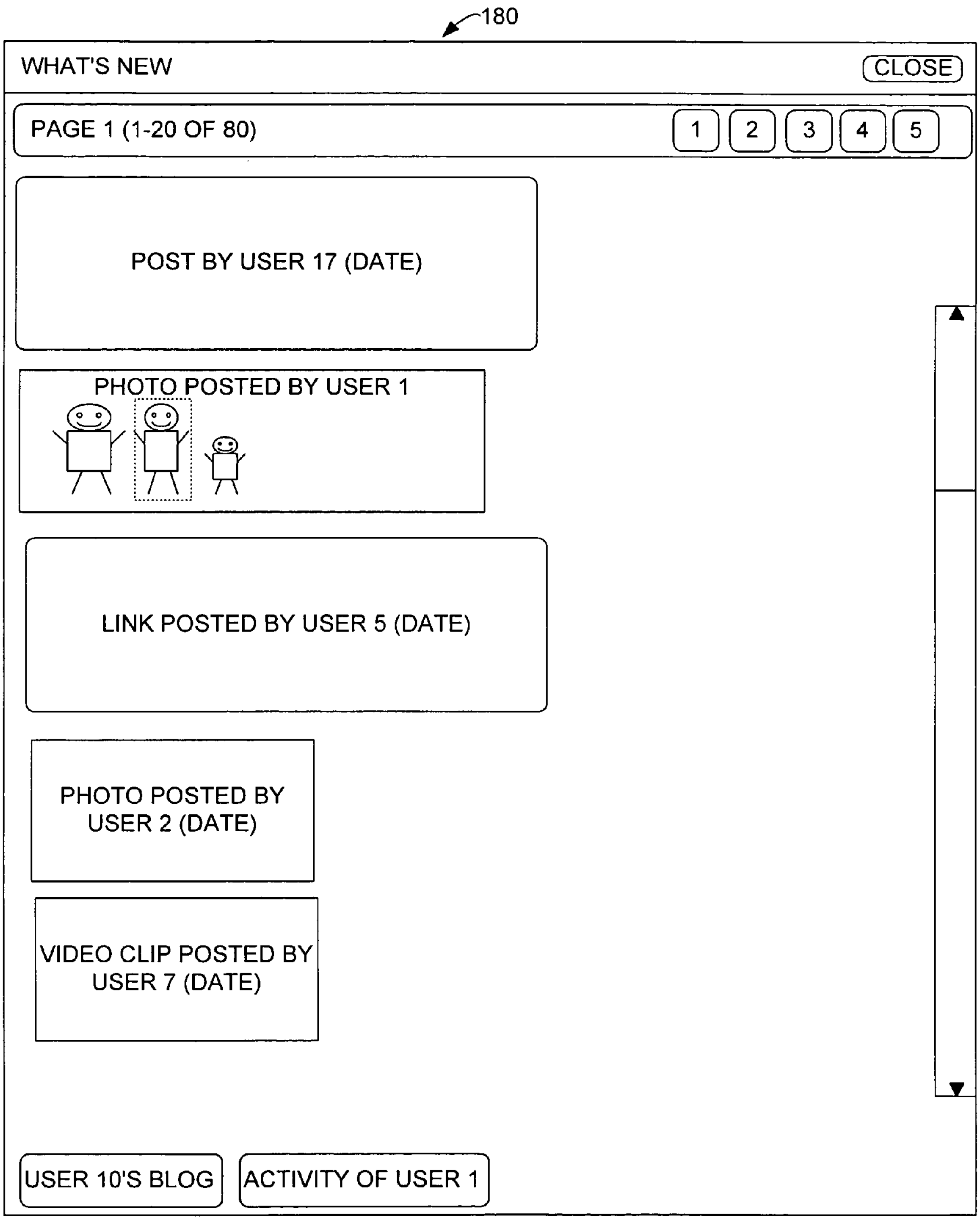
FIG. 9 is an example illustration of a recent activity view display of the user component of FIG. 2.

The tailored view manager may position the returned objects in a collage view, web log view, list or any appropriate view. The tailored view manager may position the objects in the recent activity view based upon the time the object was posted, e.g., the most or least recent post may be displayed at the top of a list or web log; and/or may be based upon the similarity metric, e.g., those objects most associated with the selected user may be listed at the top of a list or closest to the focal point in a collage view. In the example of FIG. 9, the recent activity view 180 includes a post by USER 17, a photograph posted by USER 1, a link posted by USER 5, a photograph posted by USER 2, and a video clip posted by USER 7. In the example of FIG. 9, the items on the recent activity board are ordered by date; that is, the post by USER 17 is the most recent post in the example.

External Source Manager

As shown in FIG. 2, the network manager 102 may include an external source manager 103 to send and/or receive communications such as emails or instant messages. A user may upload media objects to the network manager with an upload tool of the user input tools 110 of FIG. 2. Alternatively, a user may send or create objects to the network manager by sending an email, instant message, text message, or other communication addressed to the network manager. As shown in FIG. 2, an external source manager 103 of the network manager 102 may receive communications addressed to the network manager.

The external source manager 103 may parse a received communication into a metadata portion and a media object portion. The media object portion may include any number and/or combination of media objects to be posted to the network manager including text, images, video, sound, links, and the like. The media objects may be attached to the communication and/or the communication itself (e.g., the text message and/or embedded media objects within the text field). To parse the metadata portion, the external source manager 103 may identify information associated with the communication, such as data fields within the communication. For example, an author may be determined from the addressor field of a communication. A title may be determined from the subject line of the communication. A date stamp may be determined from the time sent or time received stamp of the electronic communication. A related member may be determined from the 'to' field or 'cc:' field of the electronic communication. The network manager may determine the size of the object, the object storage location in the network manager, other objects associated with the electronic communication and/or attached media objects, or any suitable metadata which may be described and/or associated with the underlying media object or communication.

The user may address a communication to the external source manager 103 and the external source manager may determine the correct location to post the communication based on the identified metadata. For example, the media object may be posted in a web log, in the user's media bin, and/or placed in the member's user profile depending on the address and/or indicated title of the communication.

More particularly, the external source manager may identify that the media object should be placed in a web log based upon the address of the communication, and may identify which web log will receive the media object based upon the addressor and/or subject of the communication. Alternatively, the external source manager 103 may have a separate communication address for each web log. For example, to post an entry to a particular web log, the user may address the communication to a unique alias, phone number, email address or the like associated with a particular web log. Based on the addressee (e.g., the alias, phone number, email address), the external source manager may determine the appropriate web log to post the communication contents. If an indicated web log does not exist, the external source manager may create a new web log and post the communication there. The external source manager may notify the sender of the communication that a web log has been created within the network manager.

The external source manager 103 may also determine the appropriate place within a web log to display the content and any attached media objects of the received communication. The external source manager may determine the position of the post based upon the time stamp of the communication and place the post in a time consecutive manner in the web log. Alternatively, the external source manager may determine the appropriate position for the post based on the title or subject line. For example, the subject line may refer or point to an existing story line, conversation, object, or the like and the communication may be displayed proximate the indicated object. The external source manager may store metadata indicating the appropriate location and position of the media object in the web log in the user database 113 through the network data manager.

The user may address the electronic communication directly to the external source manager. Alternatively, a user may send an email to a person and cc: the external source manager 103. In this manner, the external source manager 103 may act as a listening channel on conversations that users do not mind having others in their network overhear. For example, two users of the network may e-mail each other using their standard e-mail application. However, the "cc" line of e-mail correspondence may identify the external source manager as an additional recipient.

In Operation

When a user receives an electronic communication that has also been sent to the external source manager, that user may reply to the communication to both the sender of the communication and to the external source manager. For example, a user may reply to an e-mail communication by selecting 'reply to all' to ensure that the reply email is also posted in the same web log and web log location as the original post. In this manner, conversations between members may be displayed to users through the web log.

As noted above with respect to FIGS. 3 and 5, the user component may allow members of the network to perceive the conversation, expand the conversation, and/or join the conversation. For example, a user may access a web log of another user through the tailored view manager of the user component. The user may select a text post or other object and post a reply directly to the web log through the user input tool. Replying to a post within the web log or other stored object in the network manager may cause the network manager to send an electronic communication through the external source manager to the original participants as if the communication was sent by the user posting a reply. Alternatively, the user may send an electronic communication directly to another user and cc: the external source manager. The electronic communication may indicate, e.g., through the title field or other suitable indication, that the communication is in response to an existing web log post or other object. As noted above, the external source manager may post the reply in the appropriate place within the appropriate web log based upon metadata associated with the communication.

Figure 10:
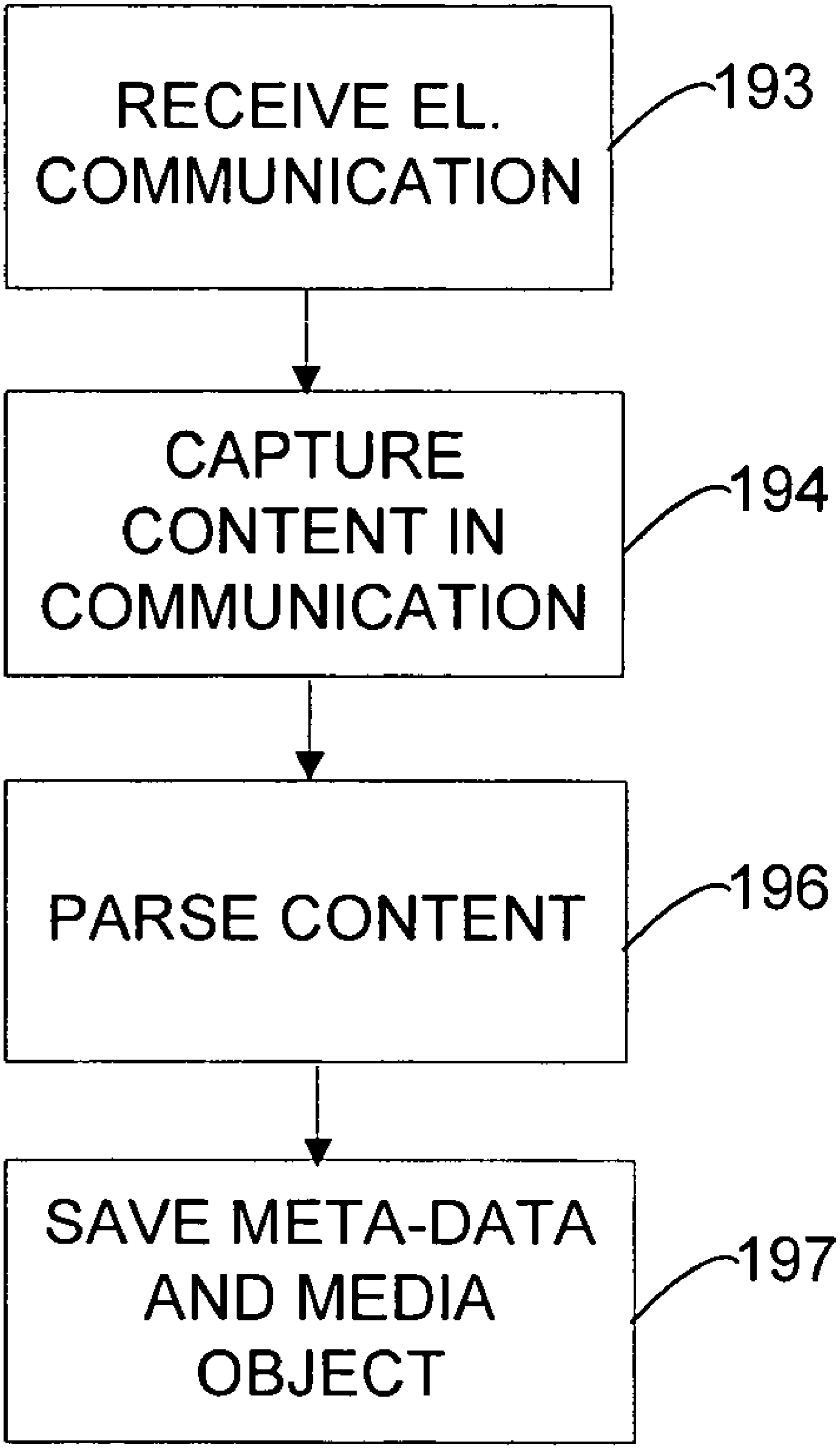
FIG. 10 is a flow chart illustrating an example method of receiving content by the network manager of FIG. 2.

FIG. 10 is a flow chart illustrating a method 192 performed by the external source manager 103. The external source manager receives 193 an electronic communication such as e-mails, instant messages, text messages, and the like from electronic devices including computers, cellular phones, palm devices, etc. The external source manager captures 194 content in the electronic communication and may parse 195 the content into metadata and at least one media object. The captured metadata and media object may be saved 196 in the network manager. For example, the external source manager may communicate the captured content to a network data manager 101 of the network manager shown in FIG. 2 to be stored in the appropriate database. The network data manager may manage access, storage and retrieval of information in a data base. In some cases, as shown in FIG. 2, it may be suitable to store the metadata in a user database 113 and store the media data objects in a media database 115.

The external source manager may also receive existing web logs from another source, such as an RSS publisher. In this manner, a user may import an existing web log into the network environment supported by the network manager.

Forward Messages

The network manager may also forward conversations, posted objects or other media to new people in the network according to the participant's own preferences settings and/or the degree of similarity within the network to the participants. For example, a member may indicate a preference to be notified of any media posting by a particular user, a particular type or media posting, any posting to the user's web log, any media objects that are determined to have a similarity metric of a particular value with respect to a selected member or object, and the like.

The network data manager may also determine a similarity metric for each newly posted object to allow users in the network to easily access the best media, such as pictures, and stories created by people they care about. In an exemplary embodiment, a similarity metric is employed to provide customized content for each individual through the use of automated inferences about what the user is likely to care about. The network data manager may use the similarity metrics between objects and users to make inferences about who people care about (that is, their relationship network) and determine if the posted media object is of importance to members in the network. More particularly, the network data manager, through the external source manager, may automatically and selectively forward posted content to a user based upon a determination that the content is similar to that member. In this manner, the network data manager may automatically select and distribute media objects to members of the network environment based upon the similarity metric.

Based upon the similarity metric, the network manger may forward media content if the similarity metric exceeds a predetermined network manager limit. For example, whenever at least a portion of a media object 214 is identified, commented, or linked, the network manager 102 may automatically forward this information to the web log and/or email address of a member determined to have a similarity metric with at least a particular value. Based upon the similarity metric, the network manger may forward media content to a specific member if the similarity metric of the newly posted object exceeds a predetermined similarity limit set by that user, such as in their user preferences. More particularly, the network manager may forward the media object, comment, label, and the like to the person identifying the text region, commenting on the text region, and/or linking the text region; the person who originally posted the media object; an identified member within the text region; and/or the subject of the text.

Figure 14:
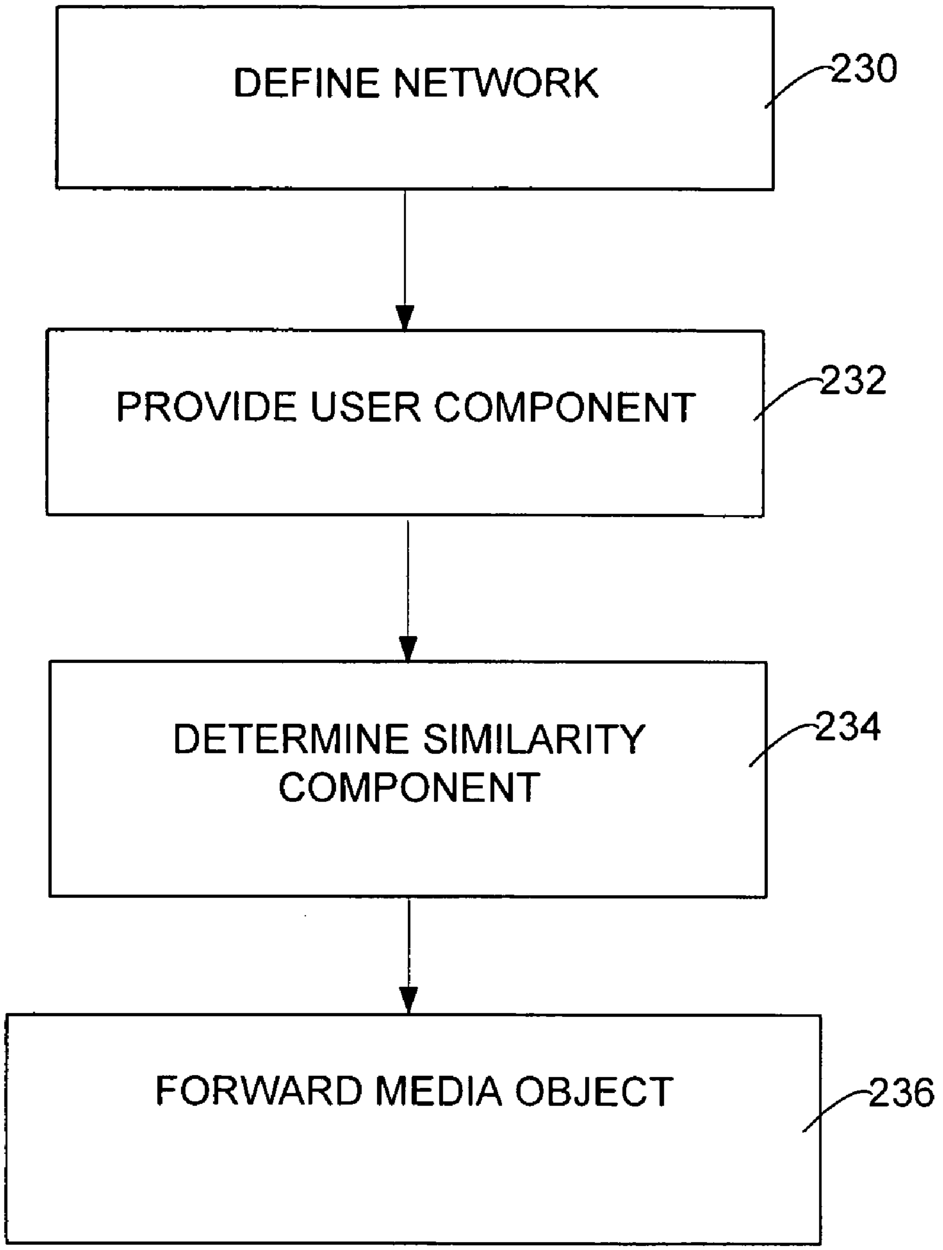
FIG. 14 is a flow chart illustrating an example method of sharing content in a network in one embodiment of the invention.

FIG. 14 illustrates one method of sharing media objects in an online environment. In the method illustrated by FIG. 14, a network environment of users is defined 230. A user component is provided 232 that allows a user of the network to post a media object. A similarity metric is determined 234 between another user of the network and the user posting the media object and/or the media object itself. The media object is forwarded 236 to the other user based on the similarity metric exceeding a predetermined value Similarity Metric The similarity between objects or members and other objects or members may be determined from metadata associated with each object or user. Metadata stored in the user database may include object metadata, network metadata, and/or association metadata.

Object Metadata

The object metadata of a media object may include a unique object identifier, a pointer indicating the object location in storage, an object type identifying the type of object such as picture, text, video, sound byte, and link; an identifier of the author who uploaded, sent or created the object to the network manager; the addressee of a communication; the content of a label, comment or title of the media object; a time indicator indicating the date and/or time the object was stored in the network manager; and/or any other suitable metadata associated with an object. The object metadata may be stored in an object table or in any suitable data store in any suitable format such as SQL or XML. The object metadata may be accessed by the network data manager when conducting a query search and/or determining a similarity metric between an object and another object and/or member. It is to be appreciated that the metadata may be stored in any format and/or in any number of tables as appropriate. For example, rather than a single metadata object table, the network data manager may maintain several object tables, e.g., one for each object type. For example, the network data manager may create, store and maintain a picture table, a text table, a video table, a sound byte table, and the like.

User Metadata

The user metadata may include a unique user identifier, a full name, screen name or alias, a time indicator indicating the last date and time the user logged into the network manager, and/or any other suitable metadata associated with a user. The user metadata may be stored in a user table or in any suitable data store in any suitable format, such as SQL or XML. The user metadata may be accessed by the network data manager when conducting a query search and/or determining a similarity metric between users or a user and an object.

Association Metadata

The network data manager may create association data that is accessible when the network data manager conducts a search and/or fulfills a request for the similarity between objects and users. Alternatively, the network data manager may determine the associations or similarity metrics between objects and users automatically when a media object, a query, or other request is presented to the network manager. The association metadata may be stored in an associations table or in any suitable data store in any suitable format, such as SQL or XML. The association metadata may be accessed by the network data manager when determining a similarity metric between objects and users. Association metadata for an object may include a unique identifier for the determined association, a link type, a user identifier of the user who posted/sent/created the object, a 'to' link identifying the object (unique object identifier), a 'from' link identifying the object or person to be linked to the object, and/or any other suitable association metadata.

In Operation

In operation, USER 1 may upload a picture from a party to the network data manager. The object metadata associated with the picture may include a unique identifier for the picture object, a type indicator identifying the object as a picture, USER 1 as the poster of the object, a web log identifier indicating the picture placement in a particular web log, and a time indicator identifying the time/date that the picture was stored in the network manager. The association metadata of the picture may include an identifier for the association, an identifier of USER 1 as the poster of the picture, a 'to' link identifying the unique picture object identifier, and a 'from' link identifying USER 1 as the member to be linked to the picture object. USER 2 may add a comment to the picture through the user input tool to identify USER 3 and USER 2 in the picture. The association metadata of the picture object may be modified to include both USER 2 and USER 3 as 'from' links, e.g., linking the picture object from USER 2 and from USER 3. Thus, in a similarity metric determined between USERS 2 and 3, the network data manager may retrieve the association metadata and determine a similarity value between USER 2 and USER 3 based upon those members being co-listed in the association metadata. In a similarity measure between USER 1 and USER 2, the network data manager may determine a similarity metric value based upon the association metadata listing USER 2 as within a picture taken by USER 1. It is to be recognized that any determination or presumption of similarity between objects and members may be based upon any combination of metadata associated with any object or member.

The media database and the user database may be any kind of database, including a relational database, object-oriented database, unstructured database, an in-memory database, or other database. A database may be constructed using a flat file system such as ACSII text, a binary file, data transmitted across a communication network, or any other file system. Notwithstanding these possible implementations of the foregoing databases, the term database as used herein refers to any data that is collected and stored in any manner accessible by a computer.

User-User Similarity Metric

The similarity metric between users may be determined by the network data manager based on several different factors, such as transaction histories, co-occurrence information, statements of friendship, and communication patterns of the users. In embodiments where the content includes media objects, co-occurrence of users in media objects, links formed by a user with a media object posted by another user, explicit statements of friendship by either or both users, comments by users on the media may be elements of the measure of similarity between users and/or any other suitable similarity factor.

To determine the communication pattern, the network manager may determine which users are sending communications to other users. For example, a communication, such as an e-mail or instant message, between users may be carbon copied to the network manager and/or communications posted through the network manager, such as through the email tool or external source manager, may be tracked through the addressor and/or addressee fields of the communication. To determine the transaction history, the network manager may track which users are commenting on and linking objects placed by other users.

Explicit statements of friendship may be a preference set by a user explicitly labeling the selected user as a friend. The network data manager may associate the users based on the 'one-way' explicit statement of friendship. Additionally, the network manager may forward the explicit statement of friendship to the selected user and request a response. In some cases, the network manager may only consider the statement of friendship in a similarity metric determination if the statement of friendship is acknowledged (a 'two-way' statement of friendship). If the user does not respond with an acknowledgement of friendship, then the network manager may include the statement of friendship only in a similarity determination if the user making the one-way statement is the focal point of a similarity determination.

The individual factors used in determining the user-user similarity metric may be normalized to provide a weight or indication of the strength of similarity between the users. For example, USER 1 may communicate more with USER 2 than USER 3. Consequently, when normalized over all of USER 1's communications, the user-user similarity metric with USER 2 may be weighted more highly than the user-user similarity metric with USER 3. Moreover, the similarity metric between users may be reduced or weighted over time. For example, more recent communications may be weighted more highly than less recent communications. The factors used in the user-user similarity metric may be determined by the network data manger from metadata stored as the association metadata, user metadata, and/or object metadata.

For example, a user-user similarity metric S may include a co-occurrence metric $S_{co\text{-}occur}$, and a statement of friendship similarity metric $S_{friendship}$. The network data manager may determine the co-occurrence similarity metric $S_{co\text{-}occur}$ by counting how often the users co-occur in objects stored in the network manager, such as in web logs, comments, pictures and other media objects. The network data manager may access the metadata and/or content of the media object itself to determine the co-occurrence of members. The network data manager may determine a friendship similarity metric $S_{friendship}$ by counting explicit statements of friendship by one user about another user. The similarity of one user to a focal point user may depend only on explicit statements of friendship made by the focal point user about another user. Alternatively, the user-user similarity metric may also consider explicit statements of friendship by other users about the focal point user, whether or not those statements were acknowledged or not. In this case, the network data manager may weight the statements of friendship differently based upon the user making the statement of friendship, e.g., those statements of friendship made by the focal point user may be weighted more strongly than those statements made by other users about the focal point user.

Each of these metrics of similarity may include several sub-metrics that are weighted accordingly. For example, the co-occurrence metric $S_{co\text{-}occur}$ may include a co-occurrence in images sub-metric, a co-occurrence in comments sub-metric, a co-occurrence in web log entries sub-metric, and a co-occurrence in story trail (e.g., linked objects) sub-metric. A weight may be assigned to each sub-metric to assign an importance. For example, the co-occurrence in pictures sub-metric may be given a higher weight than the co-occurrence in a web log entry sub-metric. In one embodiment, each of these similarity sub-metrics may be normalized between 0 and 1.

As an example of a user-user similarity metric that can be used, the co-occurrence similarity sub-metric ($S_{co\text{-}occur}$) may be defined as the frequency or number of objects ($N_{ABco\text{-}occur}$) in which two users (user A and user B) co-occur, divided by the square root of the of the product of the number of occurrences ($N_{Aoccur}$, $N_{Boccur}$) of each user in objects. More particularly, the co-occurrence metric may provide a count of the number of objects in which both members appear. This count may be normalized by the number of objects in which each selected member appears whether or not both members co-occur. In this manner, the co-occurrence metric may be determined with the following equation:

$$S_{co\text{-}occur}=N_{ABco\text{-}occur}/\sqrt{N_{\mathrm{Aoccur}}\times N_{\mathrm{Boccur}}}$$

For example, USER A may appear in three pictures with USER B, and may appear in 12 pictures overall. USER B may appear in those same three pictures with USER A and not appear in any more pictures. Thus, the similarity co-occurrence metric between USER A and USER B may have a determined value of 0.333.

The friendship similarity metric $S_{friendship}$ may be defined as the frequency or number of explicit statements of friendship ($N_{ABfriendship}$) made by the two users (USER A and USER B) about the other user divided by the square root of the of the product of the frequency ($N_{Afriendship}$, $N_{Bfriendship}$) of statements of friendship by each user whether or not those statements refer to the other user. In this manner, the friendship metric may be determined with the following equation:

$$S_{friendship}=N_{ABfriendship}/\sqrt{N_{\mathrm{Afriendship}}\times N_{\mathrm{Bfriendship}}}$$

The similarity metrics ($S_{friendship}$ and $S_{co\text{-}occur}$) may be linearly-weighted to assign an importance to each and then, combined to define the similarity metric S. Other mechanisms to calculate the metrics of a similarity metric, such as $S_{friendship}$ and $S_{co\text{-}occur}$, may be suitable and can be used in place of or in addition to the examples given above. The exact calculations to be used may depend on the particular system and/or environment of the network environment.

User-Object Similarity Metric

The user-object similarity metric may measure a person's similarity to a media object, such as a picture, as a function of several factors. The factors of the user-object similarity metric may include whether the person is the author of the picture, whether the person is in the picture, whether the person accessed the picture, whether the person linked the object to another object, whether the person commented on the picture and any other suitable similarity factor. Moreover, the similarity between a person and an object may reduced over time, such that more recent pictures are determined more similar than less recent pictures. It should also be readily apparent that a wide variety of factors other than those described by this example may be employed without departing from the spirit and scope of the appended claims.

Object-Object Similarity Metric

The object-object similarity metric may measure the similarity between two or more objects. The factors of the object-object similarity metric may include whether the same person authored the objects, whether the objects are interacted upon by the same person, and metadata associated with the objects, e.g., similar or identical labels or links. Moreover, the similarity between objects may consider time, e.g., the object-object similarity metric may weight more recently posted objects more highly than less recent objects.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method operations or system elements, it should be understood that those operations and those elements may be combined in other ways to accomplish the same objectives. Operations, elements, and features discussed only in connection with one embodiment are not intended to be excluded from a similar role in other embodiments. Moreover, use of ordinal terms such as "first" and "second" in the claims to modify a claim element does not by itself connote any priority, precedence, or order of one claim element over another or the temporal order in which operations of a method are performed, but are used merely as labels to distinguish one claim element having a certain name from another element having a same name (but for use of the ordinal term) to distinguish the claim elements.

The invention claimed is:

1. A method comprising:

defining a plurality of users in a network environment;

receiving a media object from a first user of the plurality of users;

calculating a similarity metric based on $S=N_{AB}$/SquareRoot($N_A$*$N_B$) where S indicates a normalized co-occurrence of the first user and the second user being associated with posted media objects, and where $N_{AB}$ indicates a number of the posted media objects associated with the first user and the second user, and where $N_A$ indicates a number of the posted media objects associated with the first user but not the second user, and where $N_B$ indicates a number of the posted media objects associated with the second user but not the first user; and forwarding the media object to the second user in response to the similarity metric exceeding a pre-determined value;

wherein the method is performed by a computing device.

2. The method of claim 1, wherein the pre-determined value is identified by the second user.

3. The method of claim 1, wherein the pre-determined value is identified by a network manager.

4. The method of claim 1 wherein the posted media objects associated with the first user and the second user include a posted media object with a comment by the first user, the posted media object posted by the second user.

5. The method of claim 1 wherein the media object comprises an electronic communication from the first user.

6. The method of claim 5 wherein the electronic communication is between the first user and the second user.

7. A user component comprising:

a network map manager configured to provide a network map display of user icons that each represent a user in a network environment, wherein the network map display is based on calculating a similarity metric based on $S=N_{AB}$/SquareRoot($N_a$*$N_B$) where S indicates a normalized co-occurrence of a first user and a second user being associated with posted media objects, and where $N_{AB}$ indicates a number of the posted media objects associated with the first user and the second user, and where $N_A$ indicates a number of the posted media objects associated with the first user but not the second user, and where $N_B$ indicates a number of the posted media objects associated with the second user but not the first user, the calculating performed by a computing device;

a tailored view manager configured to provide a web log view display of a web log associated with at least one of the user icons; and a user input tool configured to post, in response to user input, a media object on the web log.

8. The user component of claim 7 wherein the network map manager is further configured to graphically indicate based on the similarity metric a similarity between at least two users represented in the network map.

9. The user component of claim 7 wherein the web log includes at least one media object that includes a comment provided by one of the users.

10. The user component of claim 7 wherein the web log includes at least one image that includes an identity label identifying a person represented in the image.

11. A system for sharing media objects in a network environment, the system comprising:

a database configured to store media objects;

a memory in which machine instructions are stored; and a processor of a machine that is coupled to the database and the memory, the processor configured to execute the machine instructions to cause the machine to carry out a plurality of functions, including:

accepting a media object from a first user of the network environment;

storing the media object in the database;

calculating similarity metric based on $S=N_{AB}$/Square-Root($N_A$*$N_B$) where S indicates a normalized co-occurrence of the first user and a second user being associated with posted media objects, and where $N_{AB}$ indicates a number of the posted media objects associated with the first user and the second user of the network environment, and where $N_A$ indicates a number of the posted media objects associated with the first user but not the second user, and where $N_B$ indicates a number of the posted media objects associated with the second user but not the first user; and automatically sharing the media object with the second user in response to the similarity metric exceeding a pre-determined value.

12. The system of claim 11 wherein the processor receives an electronic communication from the first user and parses the media object from the electronic communication.

13. The system of claim 12 wherein the processor parses metadata from the electronic communication.

14. A hardware computer storage medium having computer-executable instructions stored thereon that, when executed by a computing device, cause the computing device to perform a method of sharing media objects in a network environment, the method comprising:

defining a plurality of users in the network environment;

receiving a first media object from a first user of the plurality of users;

requesting, by a second user of the plurality of users, a search based on at least one query parameter;

calculating a similarity metric based on $S=N_{AB}$/Square-Root($N_A$*$N_B$) where S indicates a normalized co-occurrence of the first user and the second user being associated with posted media objects and where $N_{AB}$ indicates a number of the posted media objects associated with the first user and the second user, and where $N_A$ indicates a number of the posted media objects associated with the first user but not the second user, and where $N_B$ indicates a number of the posted media objects associated with the second user but not the first user;

based on the at least one query parameter and the similarity metric, returning a representation of the first media object to the second user.

15. The hardware computer storage medium of claim 14 wherein the returning the representation of the media object includes returning a web log associated with the first user.

16. The hardware computer storage medium of claim 14 wherein the method further comprises posting media objects into a web log.

17. The hardware computer storage medium of claim 16 wherein the web log is associated with the first user.

18. The hardware computer storage medium of claim 16 wherein the web log is associated with the second user.

19. The hardware computer storage medium of claim 14 wherein the method further comprises posting, by the first user, a comment associated with a second media object.

20. The hardware computer storage medium of claim 14 wherein the method further comprises providing, by the first user, a label identifying a representation of the second user in the first media object.

21. The hardware computer storage medium of claim 20 wherein the method further comprises selecting, by the first user, a portion of the first media object and associating the label with the portion of the first media object.

22. A hardware computer storage medium having computer executable instructions stored thereon that, when executed by a computing device, cause the computing device to perform a method of sharing media objects in a network environment, the method comprising:

receiving an electronic communication from a first user of the network environment;

parsing the electronic communication into metadata and at least one media object, the at least one media object including an image;

calculating a similarity metric based on $S=N_4B$/Square-Root($N_A$*$N_B$) where S indicates a normalized co-occurrence of the first user and a second user of the network environment being associated with the media objects, and where $N_{AB}$ indicates a number of the media objects associated with the first user and the second user, and where $N_A$ indicates a number of the media objects associated with the first user but not the second user, and where $N_B$ indicates a number of the media objects associated with the second user but not the first user;

based on the similarity metric, automatically forwarding the at least one media object to the second user.

23. The hardware computer storage medium of claim 22 further comprising associating the at least one media object with a web log based on the metadata.

24. The hardware computer storage medium of claim 23 further comprising automatically determining a position of the at least one media object in the web log based on the metadata.

25. A hardware computer storage medium having computer executable instructions that, when executed by a computing device, cause the computing device to perform a method comprising:

displaying a map of a plurality of user icons and an indicator of similarity between each of the plurality of user icons and at least one focal point icon, the plurality of user icons and the focal point icon each representing at least one user of a network environment, the indicators of similarity each indicating a similarity between a first user represented by one of the plurality of user icons and a second user represented by the at least one focal point icon, the similarity calculated based on $S=N_{AB}$/Square-Root($N_A$*$N_B$) where S indicates a normalized co-occurrence of the first user and a second user being associated with posted media objects, and where $N_{AB}$ indicates a number of the posted media objects associated with the first user and the second user, and where $N_A$ indicates a number of the posted media objects associated with the first user but not the second user, and where $N_B$ indicates a number of the posted media objects associated with the second user but not the first user;

accepting at least one query parameter;

querying, using the at least one query parameter, a database comprising the posted media objects;

returning, based on the query, a media object wherein the media object includes an image;

associate associating a comment with at least a portion of the media object;

displaying the media object; and displaying at least one web log associated with the user represented by the focal point icon.

26. The hardware computer storage medium of claim 25, further comprising selecting a portion of the media object as an object to be associated with an other media object.

27. The hardware computer storage medium of claim 26, wherein the other media object is a comment.

28. The hardware computer storage medium of claim 26, wherein the other media object is a link.

29. The hardware computer storage medium of claim 26, wherein the other media object is an identifier of a person depicted in the image.

30. The hardware computer storage medium of claim 25, further comprising entering the media object into a web log.

* * * * *

UNITED STATES PATENT AND TRADEMARK OFFICE

CERTIFICATE OF CORRECTION

PATENT NO. : 7,886,024 B2
APPLICATION NO. : 10/882727
DATED : February 8, 2011
INVENTOR(S) : Sean Kelly et al.

It is certified that error appears in the above-identified patent and that said Letters Patent is hereby corrected as shown below:

In column 30, line 49, in Claim 7, delete “($N_a$*$N_B$) and insert -- ($N_A$*$N_B$) --, therefor.

In column 31, line 18, in Claim 11, after “calculating” insert -- a --.

In column 32, line 24, in Claim 22, delete “$N_4$B/” and insert -- $N_{AB}$/ --, therefor.

In column 33, line 3, in Claim 25, before “associating” delete “associate”.

Signed and Sealed this
Twenty-sixth Day of July, 2011

David J. Kappos
*Director of the United States Patent and Trademark Office*